United States Patent [19]

Tamatani et al.

[11] Patent Number: 5,289,081
[45] Date of Patent: Feb. 22, 1994

[54] FLUORESCENT LAMP WITH PHOSPHOR HAVING COATED PHOSPHOR PARTICLES

[75] Inventors: Masaaki Tamatani, Fujisawa; Hidenori Ito, Yokosuka; Akira Taya, Kawasaki; Yoji Yuge, Chigasaki; Kazuaki Nakagawa, Urayasu; Shigeru Ando, Hiratsuka; Kenji Terashima, Chigasaki, all of Japan

[73] Assignees: Kabushiki Kaisha Toshiba, Kawasaki; Toshiba Lighting & Technology Corporation, Tokyo, both of Japan

[21] Appl. No.: 798,727

[22] Filed: Nov. 27, 1991

[30] Foreign Application Priority Data

Nov. 28, 1990 [JP] Japan .................... 2-327130
Nov. 28, 1990 [JP] Japan .................... 2-328167
Jan. 10, 1991 [JP] Japan .................... 3-65739
Apr. 24, 1991 [JP] Japan .................... 3-94453
Aug. 30, 1991 [JP] Japan .................... 3-220637

[51] Int. Cl.$^5$ .......................................... H01J 61/44
[52] U.S. Cl. .................................. 313/487; 313/486
[58] Field of Search ........................... 313/486, 487

[56] References Cited

U.S. PATENT DOCUMENTS 4,335,330  6/1982  Peters et al. ................. 313/486
4,423,349 12/1983  Nakajima et al. ............. 313/487
4,691,140  9/1987  Sakakibara et al. ........... 313/486
4,999,219  3/1991  Klinedinst et al. ......... 313/486 X Primary Examiner—Donald J. Yusko
Assistant Examiner—Michael Horabik

[57] ABSTRACT

A fluorescent lamp characterized in that the charging tendency of a phosphor used is positioned more negative side than that of metal oxides each having a metal ion electronegativity $X_i$ of 7.0 but more positive side than that of metal oxides each having a metal ion electronegativity $X_i$ of 11.8, that particles of the phosphor are charged positive and smaller than 3.0 $\mu$C per gram when they are in contact with soda lime glass beads each having a particle size of 200–500 $\mu$m, or that they are charged negative and larger than $-0.5$ $\mu$C per gram when they are in contact with reduced iron powder having a particle size of 44–74 $\mu$m.

21 Claims, 12 Drawing Sheets

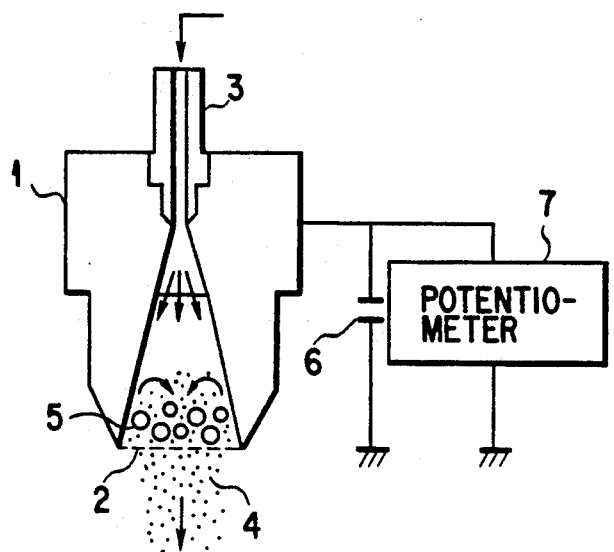
F I G. 2
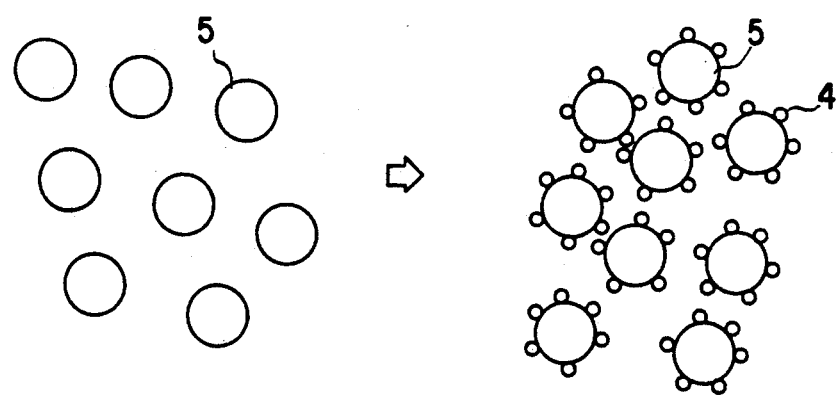
F I G. 3A    F I G. 3B

| CARRIER | (+) | SAMPLE |
|---|---|---|
| | — ZnF$_2$ | |
| NYLON — | | |
| | — ZnO:Zn | |
| | — Sr$_{10}$(PO$_4$)$_6$Cl$_2$:Eu | |
| | — Y$_2$O$_3$:Eu | |
| Al — | — (Sr,Ca)$_{10}$(PO$_4$)$_6$Cl$_2$:Eu | |
| | — Ba$_2$P$_2$O$_7$ | |
| POLYVINYL ALCOHOL — | — BaMg$_2$Al$_{16}$O$_{27}$:Eu | |
| | — Y(P,V)O$_4$:Eu | |
| | — (Ce,Tb)MgAl$_{11}$O$_{19}$ — HgO | |
| | — Sr$_2$P$_2$O$_7$ | |
| Cr — | — (La,Ce,Tb)PO$_4$ | |
| | — Y$_2$O$_2$S:Eu | |
| | — Ca$_2$P$_2$O$_7$ | |
| | — Ca$_{10}$(PO$_4$)$_6$(F,Cl)$_2$:Sb,Mn | |
| GLASS — | | |
| Fe — | — Y$_2$SiO$_5$:Ce,Tb | |
| | — YVO$_4$:Eu | |
| POLYSTYRENE — | | |
| | — Zn$_2$SiO$_4$:Mn | |
| POLYVINYLIDENE FLUORIDE — | | |
| | — ZnS:Cu,Al | |
| | — ZnSe | |
| | (−) | |

F I G. 4

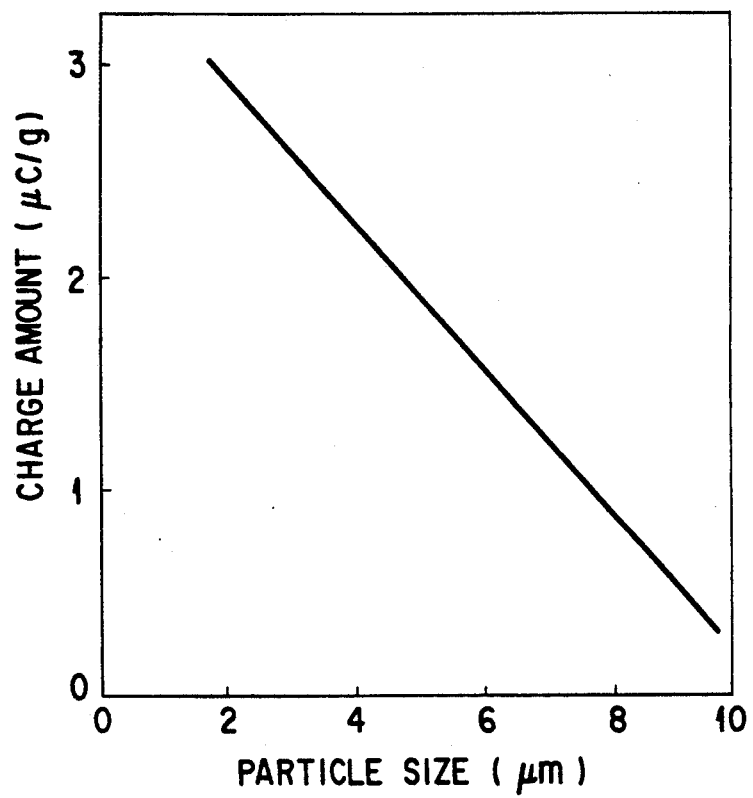
F I G. 5

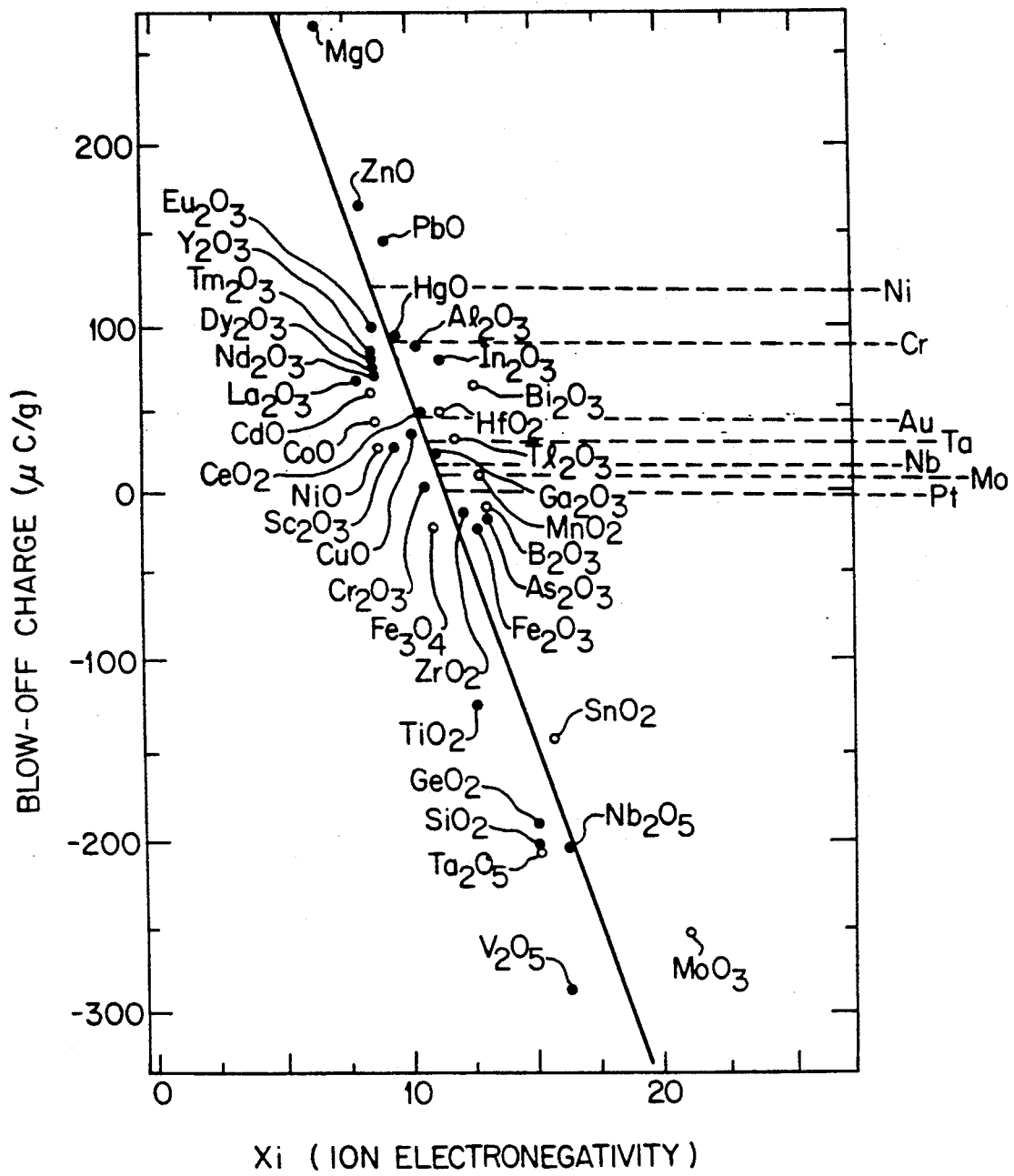
F I G. 6

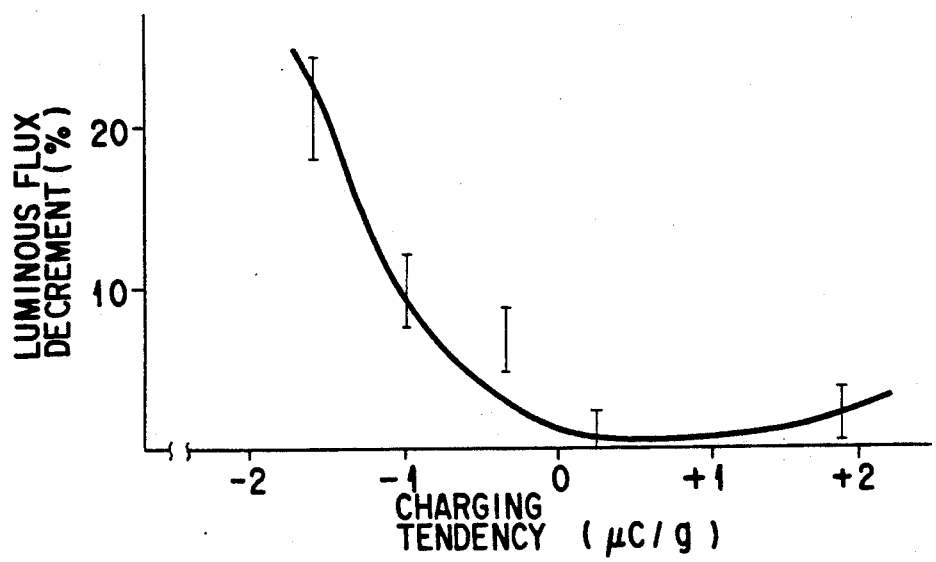
F I G. 18
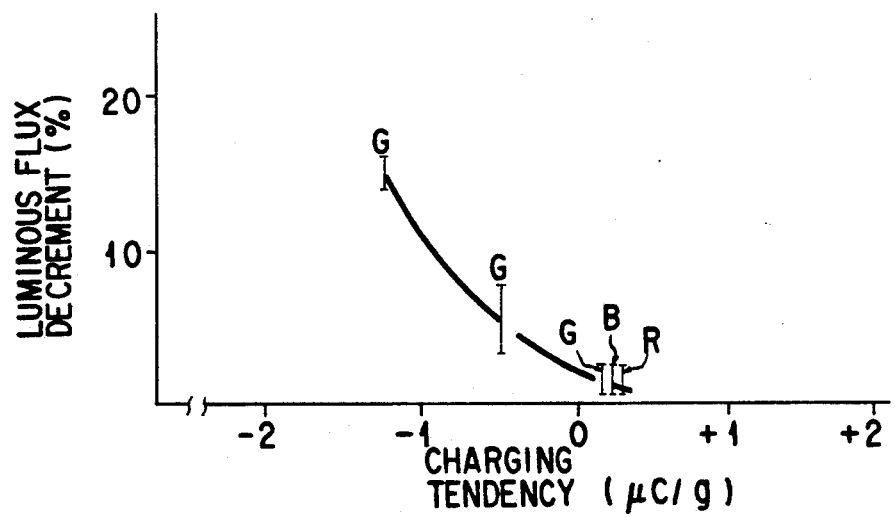
F I G. 19

FLUORESCENT LAMP WITH PHOSPHOR HAVING COATED PHOSPHOR PARTICLES

BACKGROUND OF THE INVENTION

1. Field of the Invention

The present invention relates to a fluorescent lamp capable of reducing the occurrence of blackening, is smaller in the rate of lowering luminous flux and rapid rising of luminous flux at starting stage of lighting.

2. Description of the Related Art

The fluorescent lamp is widely used as light sources for common illuminations, office automation machines, and light-emitting elements of the giant screen color display apparatus and also as back lights for liquid crystal displays. The reason why it is so widely used in various fields resides in that the electric power supplied can be converted into radiation with extremely high efficiency.

This fluorescent lamp is arranged so that the filling gas including mercury and one or two or more rare gases are filled in a glass tube on whose inner face a fluorescent layer is coated and, that positive column discharge is generated in the filling gas.

The positive column discharge can be usually kept generated by supplying electric energy to the filling gas between two electrodes. Mainly ultraviolet rays are generated by this discharge and most of them have wavelengths of 185 nm and 254 nm. The intensity ratio of the 185 nm light to 254 nm light is usually in a range of 0.2–0.4. These ultraviolet rays are converted into radiation which has longer wavelengths by the fluorescent layer on the inner face of the glass tube. These wavelengths depend upon the kind of phosphor particles contained in the phosphor layer and they range from those of near ultraviolet rays to those of visible rays and even those of near infrared lights. The most popular low fluorescent lamp is of the 40 W type shaped like a straight glass tube having a length of 1200 mm and an inner diameter of about 37 mm. The inner wall of this lamp is about 300 W/m$^2$. Note that "inner wall load" is defined a consumptive power per unit area of the inner face.

The glass tube can be variously shaped like a circle, a letter U and a saddle in addition to like the straight line. As the fluorescent lamps have been made smaller and smaller in size, most of their glass tubes have been shaped in various complicated forms.

As the color rendering properties of the fluorescent lamp have been deemed as being more and more important, the three component type white-emitting fluorescent lamp in which blue, green and red emitting phosphors each having a relatively narrow band emission spectrum distribution are used has become more and more popular. In the case of this three component type fluorescent lamp, the characteristics of the green emitting phosphor is important because the luminous ratio of the green component to the white luminous flux (or output) of the lamp is the highest among the three color components. Rare-earth aluminate-silicate-phosphate phosphor, rare-earth borate-silicate-phosphate phosphor, rare-earth orthophospate phosphor, rare-earth aluminate borate phosphor and the like, each is activated by cerium and terbium, are well known as the green emitting phosphor.

As the fluorescent lamp has been made smaller and smaller in size as described above, the inner wall load of its tube increased. Some fluorescent lamps each having a relatively high inner wall load are disclosed in German Patent Disclosure 2109898 and others. However, these lamps of a relatively high inner wall load have such drawbacks that their lamp efficiency is lower, that the rate of their lowering luminous flux is higher, that the occurrence of their blackening is faster, and that the rising of their luminous flux is slower, as compared with the common mercury lamp.

Japanese Patent Disclosure Sho 54-42874 discloses a lamp wherein phosphor particles whose positive ions have the elemental electronegativity values lower than 1.4 are used to form the phosphor layer which has a low luminous flux lowering rate. However, the single measure disclosed in this reference is not enough to prevent luminous flux from being lowered and the lamp from being blackened.

Blackening of the fluorescent lamp has been considered to be caused by the following factors. Firstly the phosphor itself is deteriorated. The reasons are supposed to reside in that the color center is formed in the phosphor by vacuum ultraviolet rays produced by the positive column discharge and that the surface structure of the phosphor layer is changed by the colliding of Hg ions at the surface of the phosphor layer. Secondly, the glass tube is black ended or colored by impurities and reaction products in it. This is supposed to reside in that vaporized fragment and cathode matters, compounds caused by residues of organic binders, and/or mercury and mercury compounds contained in the filling gas adhere to the phosphor layer.

Those extents to which the lamp glass tubes are blackened are sometimes different from one another and the qualities of the lamps produced are not the same in the case of the conventional fluorescent lamp which has a relatively high inner wall load, depending upon the kinds of phosphor particles (or fluorescent matters) used even though the lamps are manufactured according to the same process and the lamps thus manufactured are the same in structure and also depending upon the manufacturing lots even though the phosphor particles used are of the same kind. Particularly in the case of the green emitting rare-earth phosphor, the blackening phenomenon is more liable to be caused by contaminations originating from the adhesion of mercury and its compounds, as compared with the red emitting phosphor. In the case of the three components type white emitting fluorescent lamp whose luminous flux depends severely on the luminous efficiency of the green emitting phosphor used, therefore, the above-mentioned drawbacks become more remarkable.

As described above, the conventional fluorescent lamp which has a relatively high inner wall load has advantages of being made small and compact in size, but it has such drawbacks that its luminous efficiency is lower, that its blackening is liable to be caused earlier, that its luminous flux lowering rate is higher, and that the rising of its luminous flux is slower. In addition, these drawbacks are not caused in the same way and it is difficult for the lamps thus produced to have the same quality.

The reason why the rising of luminous flux is slow is supposed to be caused by the mercury adsorption to the phosphor. Particularly when the inner wall load of the lamp becomes high, the probability that mercury ions are re-bonded with electrons to become mercury atoms at the surface of the phosphor particles becomes high as electric current density is increased. The mercury atoms are liable to be adsorbed onto the phosphor layer when the lamp is turned off as well as when it is turned on. When it is again turned on, this mercury adsorbed is firstly desorbed. Mercury cohering to the coolest part of the lamp so then gradually vaporized and luminous flux rises with increase in the vapor pressure of the mercury in the glass tube. FIG. 1 shows the relation between relative luminous flux and lighting time in the case of the conventional fluorescent lamps, wherein a curve (A) represents the rising of luminous flux in the case of the fluorescent lamp of 40 W which has a relatively low inner tube wall load and which is shaped like a straight tube and another curve (B) that of luminous flux in the case of the fluorescent lamp in which the three component bands emitting phosphor is used and whose inner wall load is larger than 500 W/m². In FIG. 1, a part (x) denotes the time at which mercury adsorbed on the phosphor layer is adsorbed and another part (y) the time at which mercury cohering to the coolest part of the lamp is gradually vaporized.

SUMMARY OF THE INVENTION

The present invention is intended to eliminate the above-mentioned drawbacks and the object of the present invention is therefore to provide a fluorescent lamp having a low rate of lowering luminous flux capable of preventing the occurrence of blackening, and rapid rising of luminous flux at the starting stage of the lighting operation although having a high tube wall load.

A fluorescent lamp of the present invention comprises a light transmission glass tube, a phosphor layer coated on the inner wall of the light transmission glass tube and including phosphor particles, filling gas filled in the light transmission glass tube and including mercury and rare gas, and a means, arranged in the light transmission glass tube, for generating positive column discharge in the presence of the filling gas in the glass tube.

According to a first aspect of the present invention, the phosphor particles have such charging tendency that is negative relative to an oxide having a cation electronegativity $X_i$ of 7.0 and that is positive relative to an oxide having a cation electronegativity $X_i$ of 11.8. The cation electronegativity $X_i$ can be expressed as follows:

$$X_i = (1+2z) X_0$$

wherein z represents the ion valency of metal ion and $X_0$ the Pauling's electronegativity.

According to a second aspect of the present invention, the phosphor particles are those which are electrified or charged by positive charge smaller than 3.0 $\mu$C per gram when they are in contact with soda lime glass beads each having a particle size of 200–500 $\mu$m.

According to a third aspect of the present invention, the phosphor particles are those which are electrified or charged larger 0.5 $\mu$C per gram when they are in contact with reduced iron powder whose particle size is in a range of 44–74 $\mu$m.

According to the fluorescent lamp of the present invention, the adhering of mercury and its compounds to the phosphor layer, which is the cause of blackening the fluorescent lamp, can be reduced with a higher reliability and reproducibility. As the result, the rising characteristic of luminous flux at starting stage operation can be improved easily and a higher reproducibility and the rate of lowering luminous flux during long operation can be made lower. This lamp is most suitable for one smaller in size and having a high inner wall load, and its industrial value is extremely higher.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 schematically shows the structure of the Faraday cage of the blow-off powder charge measuring device which measures charges produced on phosphor matters employed by the present invention;

FIG. 3A shows particles of carrier powder;

FIG. 3B shows the particles of carrier powder mixed with those of measuring sample;

FIG. 4 shows a contact electrification series including phosphors various kinds of carrier powder used for determing the phosphors position in the series are also shown;

FIG. 5 is a graph showing an example of interrelations between particle size and charge amount;

FIG. 6 shows the interrelation between charge and cation electronegativity in the case of inorganic compounds measured with the blow-off charge measuring device;

FIG. 18 is a graph showing the relation between the luminous flux decrement of the fluorescent lamp and the charging tendency of a further phosphor; and FIG. 19 is a graph showing the relation between the luminous flux decrement of a further fluorescent lamp and the charging tendency of a further phosphor.

DETAILED DESCRIPTION OF THE PREFERRED EMBODIMENTS

Figure 1:
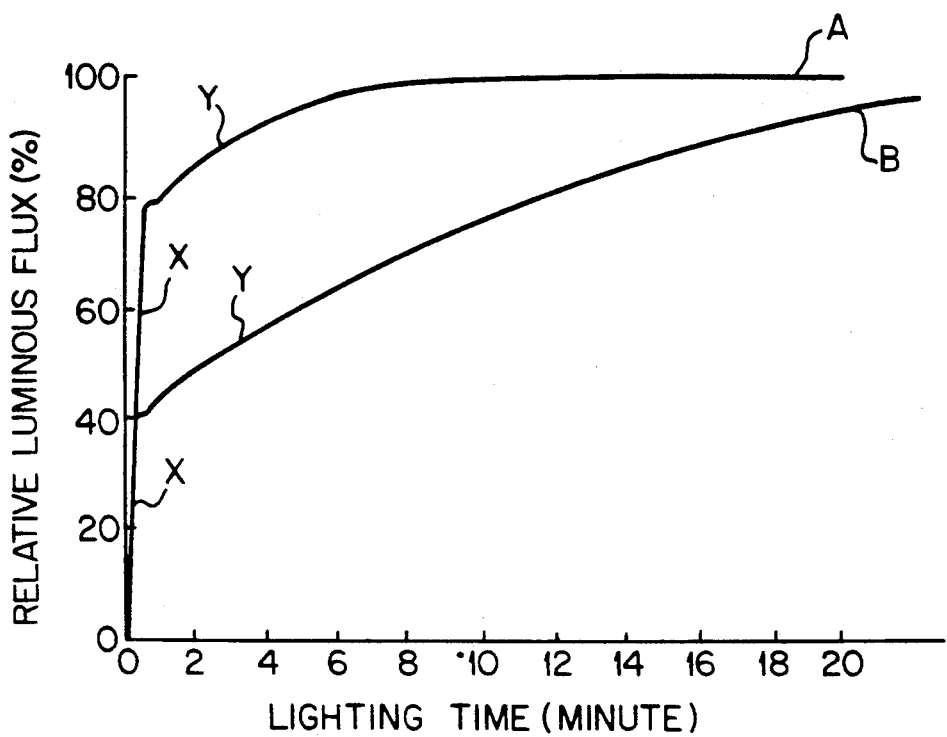
FIG. 1 is a graph showing the relation between relative luminous flux rate and lighting time in the case of the conventional fluorescent lamps.

Our inventors have found that the blackening of fluorescent lamps, particularly those of the high load type, which blackening is caused by mercury adsorption, is interrelated to the charging tendency of the surface of phosphor particles (including surface treating agents) which form the phosphor layer. The present invention is based on this finding.

The fluorescent lamp of the present invention is provided according to three aspects.

The fluorescent lamp according to the first aspect of the present invention comprises a light transmissive glass tube in which filling gases including mercury and rare gase are filled, a phosphor layer coated on the inner wall of the light transmissive glass tube and including phosphor particles, and a means for keeping positive column discharge generating in the filling gases, wherein the charging tendency of the phosphor particles which form the phosphor layer and wherein the cation electronegativity $X_i$ can be defined in such a way that $X_i = (1 + 2z) X_0$.

The fluorescent lamp according to the second aspect of the present invention comprises a light transmission glass tube in which filling gases including mercury and rare gas are filled, a phosphor layer coated on the inner wall of the light transmission glass tube and including phosphor particles, and a means for keeping positive column discharge generating i the filling gases, wherein the phosphor particles are those which are charged or electrified by positive charge smaller than 3.0 $\mu C$ per gram when they are in contact with soda lime glass beads whose particle size is in a range of 200–500 $\mu m$.

The fluorescent lamp according to the third aspect of the present invention comprises a light transmission glass tube in which filling gases including mercury and rare gas are filled, a phosphor layer coated on the inner wall of the light transmission glass tube and including phosphor particles, and a means for keeping positive column discharge generating in the filling gases, wherein the phosphor particles are those which are charged larger than $-0.5$ $\mu C$ per gram when they are in contact with reduced iron powder whose, particle size is in a range of 44–74 $\mu m$.

It is preferable that the surface of the phosphor particles is coated with some kind of oxides, which have a predetermined amount, to have and keep the above-mentioned charge.

The fluorescent lamp of the present invention is extremely effective when it is of the high tube wall load type in which the inner wall load ranges from 500 W/m$^2$ to 2000 W/m$^2$.

When dissimilar two materials are being in contact with each other, positive and negative charges, same in amount, are usually generated on the surface of each of the materials. It is said that positive-charged materials have positive-charging tendency and that negatively-charged materials have negative-charging tendency. A contact electrification series is obtained according to charging tendencies of materials, ranking a material which is positively charged against any materials at the top and a material which is negatively charge relative to any material at the bottom. Some electrification series are well-known about natural and organic materials when arbitrarily selected two kinds of materials in the series are in contact with each other, the material which is ranked up is positively charged while the other material which is ranked low is negatively charged. Materials are regarded to have strong positively-charging tendency as they are ranked nearer to the top of the series.

It is said that managanese-activated zinc silicate phosphor ($Zn_2SiO_4:Mn$), for example is liable to be blackened. It has been found that $Zn_2SiO_4:Mn$ among lamp phosphors has the strong negatively charged tendency. On the other hand, mercury filled in the light transmission glass tube reacts with impurity gas as $CO_2$ emitted from the component in the lamp to become HgO. It has been found that this HgO which is a mercury compound tends to be more positively charged than $Zn_2SiO_4:Mn$. It is therefore supposed that when $Zn_2SiO_4:Mn$ adsorbs HgO, those surfaces of $Zn_2SiO_4:Mn$ and HgO which are in contact with each other are charged negatively and positively respectively, and the blackening of the phosphor layer is caused because electrostatic attractive force thus created make it difficult to release them from each other. In other word, it is supposed that the blackening of the phosphor layer is more liable to be caused as the charging tendency of a material becomes more and more apart from that of HgO. This has been confirmed from results obtained by chemically analyzing substance adsorbed.

The atomic ratio of ZnO to $SiO_2$ in $Zn_2SiO_4:Mn$ is 2:1 in stoichiometry composition, but in the commercial phosphors it is hardly 2:1 and the value of ZnO relative to $SiO_2$ is often in a range of 1.5–2.2. Generally speaking, the phosphor $Zn_2SiO_4:Mn$ is strongly negatively charged, as described above, and when the compositional ratio of ZnO relative to $SiO_2$ is smaller than 2.0, the negative-charging tendency of the phosphor becomes stronger. When it is larger than 2.0, however, charging tendency shifts toward positive direction. It has been therefore found that it is difficult to judge the charge characteristic of a phosphor from its chemical formula. In addition to this deviation from the stoichiometry composition, various factors are present to make it difficult to judge the charge characteristic of phosphors.

In the case of the fluorescent lamp according to the present invention, phosphor particles (including those surface-treated in some way) have a charging tendency more negative than metal oxides, each having a metal ion electronegativity of 7.0, but more positive than metal oxides, each having a metal ion electronegativity of 11.8. Phosphor particles are preferred whose charge amount per gram is found smaller than 3.0 $\mu C$ measured by the Faraday cage of the blow-off powder charge measuring device when they are in contact with soda lime glass beads whose particle size is in a range of 200–500 $\mu m$, or those whose charge amount per gram is found more positive than $-0.5$ $\mu C$ when they are in contact with reduced iron powder whose particle size is in a range of 44–74 $\mu m$ are used, so that the occurrence of blackening can be suppressed with higher reliability and reproducibility.

The charge characteristic (or charging tendency of phosphor particles which form the phosphor layer is measured as follows in the case of the present invention.

FIG. 2 schematically shows the structure of the Faraday cage of the blow-off powder charge measuring device. The Faraday cage 1 is made of conductive material and a wire mesh filter 2 (Taylor No. 400-mesh stainless steel net) is attached to one end of the cage 1 while a nozzle 3 is attached to the other end thereof. A capacitor 6 and an electrometer 7 are connected to the Faraday cage 1. A mixture of sample powder 4 whose particle size is smaller than aperture size of the wire mesh 2 and carrier powder 5 whose particle size is larger than aperture size of the wire mesh 2 is contained in the Faraday cage 1. When compressed gas (or nitrogen gas, for example) is blown for this mixture through the nozzle 3, only the sample powder 4 is blown off outside the cage 1 through the wire mesh 2. Charge Q same in amount as that carried away with the sample powder 4 and having a polarity opposite to that of charge carried away with the sample powder 4 remains in the carrier powder 5 which is left in the cage 1. This charge Q can be calculated to be $Q = C \cdot V$ from voltage V measured by the electrometer 7 and capacity C of the capacitor 6. When weight m of the sample powder 4 blown off is used, the powder charge amount per gram can be obtained in the form of $-Q/m$ (coulomb/gram).

Powder that does not pass through the 400-mesh is usually used as the carrier powder 5. Carrier (or soda lime glass beads) which had a particle particle size too large to pass through the 200-mesh filter was used in this case. Phosphor particles (or powder) which had a particle size small enough to pass through the 400-mesh were used as the sample powder 4.

An example of preparing a measuring sample will be described in the following.

Carrier powder of 20 g and phosphor powder of 0.2 g are accurately measured by the chemical balance, transferred into an agate mortar, and well mixed by a soft hand blending pestle. This mixture is transferred into a wide-mouth polyethylene bottle and shaken for five minutes by the shaker for thorough mixing. 0.2 g of this mixed powder of carrier and sample powders are accurately measured to prepare the sample which is to be used for the blow-off powder charge measurement. FIGS. 3A and 3B show particles of the carrier powder and those of the measuring sample (after it is mixed with the carrier). When the carrier powder 5 shown in FIG. 3A is mixed with the sample powder, the sample powder particles 4 are attached on each of the carrier particles as shown in FIG. 3B.

Results obtained for various samples measured by the blow-off powder charge measuring device will be described. Charging tendencies of phosphors were ranked at first using various kinds of carrier. FIG. 4 shows results thus obtained. This series of the charging tendency means that a material ranked up is charged positively and another material ranked low is charged negatively when arbitrarily selected two materials on the series when they are in contact with each other. It is expected from FIG. 4 that particles (or powder) of the phosphor adsorb fewer particles of HgO as the charging tendency of the phosphor is ranked nearer to that of HgO but that they adsorb more particles of HgO as the charging tendency of the phosphor is ranked remoter from that of HgO. (However, FIG. 4 shows no quantative charging tendency of phosphors but only the ranking of them. It cannot be therefore predicted how much blackening is caused when they are at what position in the series remote from HgO unless trial and error are made.)

Contact charge amount of various phosphors were measured using, as the carrier powder, soda lime glass beads (GB-377 made by Toshiba Ballotini Corporation) each having the above-mentioned particle size of 200–500 $\mu$m. It was found that most of the phosphors were charged positive (+) and that they have a charge of 0.1–3 $\mu$C/g. It was also found that relatively a few of them were charged negative (−). However, it was also found in this measurement that measured values were dispersed, depending on particle size, preparing lot, and the deviation from the stoichiometry composition of the phosphors. Of these factors, the particle size affects the contact charge amount most significantly. This effect may be attributed to the large difference in the surface area of the sample powders. FIG. 5 shows the relationship between charge amount and particle size in a case where $Y_2O_3$:Eu phosphor is used as the sample powder. As shown in FIG. 5, it can be understood that the charge amount of the phosphor depends largely on its particle size even when the phosphor composition is not charged.

Measurement will be therefore carried out in the present invention under such a condition that the phosphor sample powders have nearly the same particle size. More specifically, charge amounts of the phosphors will be measured in the present invention under the condition that particle sizes of the phosphors are within $5 \pm 2$ $\mu$m. Results measured under this condition are shown in Table 1.

TABLE 1

| Sample No. | Phosphor (Chemical Formula): | Charge ($\mu$C/g) |
| --- | --- | --- |
| 1 | $BaMg_2Al_{16}O_{27}:Eu^{2+}$ | 1.5 |
| 2 | $(Sr,Ca)_{10}(PO_4)_6Cl_2:Eu^{2+}$ | 1.8 |
| 3 | $(Sr,Ca,Ba)_{10}(PO_4)_6Cl_2:Eu^{2+}$ | 1.6 |
| 4 | $(Ba,Ca,Mg)_{10}(PO_4)_6Cl_2:Eu^{2+}$ | 1.2 |
| 5 | $La_2O_3 \cdot 0.2SiO_2 \cdot 0.9P_2O_5:Ce,Tb$ | 0.7 |
| 6 | $(La,Ce,Tb)PO_4$ | 0.8 |
| 7 | $Y_2SiO_5:Ce,Tb$ | −0.5 |
| 8 | $(Ce,Mg)Al_{11}O_{19}:Tb$ | 1.1 |
| 9 | $Zn_2SiO_4:Mn$ | −2.8 |
| 10 | $Y_2O_3:Eu^{3+}$ | 2.0 |
| 11 | $YVO_4:Eu^{3+}$ | −1.5 |
| 12 | $Y(P,V)O_4:Eu^{3+}$ | 1.4 |
| 13 | $Y_2O_2S:Eu^{3+}$ | 0.7 |
| 14 | $3.5MgO \cdot 0.5MgF_2 \cdot GeO_2:Mn$ | 3.3 |
| 15 | $Zn_3(PO_4)_2:Mn$ | −2.5 |

FIG. 6 shows the charging tendencies of simple oxides including HgO. This result was obtained by using the blow-off powder charge measuring device (see Journal of Electrochemical Society; Page 842, Volume 133 (1986)). As shown in FIG. 6, the oxides used in the present invention include $Eu_2O_3$, $Y_2O_3$, $Tm_2O_3$, $Dy_2O_3$, $Nd_2O_3$, $La_2O_3$, CdO, CoO, CuO, NiO, $Sc_2O_3$, $CeO_2$, $Cr_2O_3$, $Fe_3O_4$, $ZrO_2$, $GeO_2$, $Ta_2O_5$, $V_2O_5$, $MoO_3$, $Nb_2O_5$, $SnO_2$, $Fe_2O_3$, $As_2O_3$, $B_2O_3$, $MnO_2$, $Ga_2O_3$, $Tl_2O_3$, $HfO_2$, $Bi_2O_3$, $In_2O_3$, HgO, PbO, ZnO, MgO, $SiO_2$, $TiO_2$ and $Al_2O_3$. In order to compare to the charge amount per unit area, the product of the charge amount of each of the particulate oxides, approximately uniform in to iron powder, and the specific gravity of each of them is plotted on the vertical axis in FIG. 6.

Values of their charge amounts shown are large accordingly.

As apparent from FIG. 6, the change amounts measured as described above have extremely good interrelation to electronegativities $X_i$ of metal ions which form the oxides, and the oxides tend to be charged more positive as $X_i$ becomes smaller while more negative as $X_i$ becomes larger.

The ion electronegativity $X_i$ of metal is expressed by the next equation.

$$X_i = (1+2Z) X_O$$

wherein Z represents the ion valence of metal ion and $X_O$ denotes the Pauling's electronegativity.

HgO has substantially the same charging tendency as those of $Y_2O_3$. It is therefore supposed that HgO is difficult to be adsorbed onto those phosphors whose main component is $Y_2O_3$. On the contrary, it is easy for HgO to be adsorbed onto those phosphor particles whose charging tendency is largely different or remote from that of HgO. It was therefore experimentally confirmed how much difference in charging tendency was allowed from that of HgO for manufacturing the fluorescent lamps with good performance. It was thus found that the occurrence of blackening could be suppressed when those phosphor particles whose charge amount measured according to the above-mentioned measuring manner were smaller than 3 $\mu$C/g were used. When the charge amount of phosphor particles becomes larger than 3 $\mu$C/g, the difference in the charging tendency between the phosphor and HgO becomes too large and the possibility of blackening becomes high. More preferable, the charge amount is in the range of 0.5–2.5 $\mu$C/g.

Charge amounts of various phosphor particles were measured in the above case using, as the carrier, the glass beads each having a predetermined particle size, but similar charging tendency was found in a case where reduced iron powder each particle having a particle size of 44–74 $\mu$m was used as the carrier. Preferable charge in this case, however, is in a range of $-0.5$–2.5 $\mu$C/g.

Charging tendency which does not depend on the particle size can be determined as follows. First charging tendencies of metal plates can be examined based on those of the oxide particles. The metal plate is tilted from the horizontal plane by about 45 degrees, particles of each of the oxides are rolled over the slope of this metal plate and they are received in a Faraday cage type receptacle. The charge polarity of the particles is checked in a receptacle to which an electrometer and a capacitor are connected. When oxide A shows positive polarity against the type plate and oxide B shows negative polarity against the plate, the charging tendency of the plate lies between those of A and B. The charging tendency position among those of oxides can be correctly determined by using this procedure successively with various oxides. The charging tendency positions thus obtained of metal plates such as nickel, chromium and tantalum are also shown in FIG. 6. Next, the metal plates whose charging tendency positions have been determined in this manner are tilted, particles of each of the phosphors are rolled over the slopes of these metal plate and their charge polarities are checked in the receptacle. Their charging tendencies relative to that of the metal plates can be thus obtained. From these charging tendencies of metal oxides, metals and phosphors which are obtained as described above, it can be indirectly understood what relation exists in the charging tendencies of mercury oxides and phosphors. Even in the case of phosphor particles whose particle size is different from those of the others, their charging tendency can be compared using FIG. 6.

The charge amount of 0.5–2.5 $\mu$C/g obtained by the blow-off powder charge measuring device in the case where each of the phosphor particles has the particle size of 5±2 $\mu$m and the glass glass beads each having a certain particle size is used as the carrier, means in FIG. 6 such a charging tendency is positioned more positive than that of metal tantalum but more negative than that of nickel. When this charging tendency is expressed in the form of the metal ion electronegativity, it is in a range of 7.0–11.8. It is therefore important that the charging tendency of phosphor particles is positioned more negative than that of metal oxides having the metal ion electronegativity of 7.0 but more positive than that of metal oxides having the metal ion electronegativity of 11.8.

As more concrete example of the phosphors (or phosphor particles) employed by the present invention, there can be cited blue emitting phosphors activated by divalent europium such as $BaMg_2Al_{16}O_{27}:Eu^{2+}$, $Sr_{10}(PO_4)_6Cl_2:Eu^{2+}$, $(Sr, Ca)_{10}(PO_4)_6Cl_2:Eu^{2+}$, $(Sr, Ca, Ba)_{10}(PO_4)_6Cl_2:Eu^{2+}$, and $(Ba, Ca, Mg)_{10}(PO_4)_6Cl_2:Eu^{2+}$; green emitting phosphors such as $La_2O_3 \cdot 0.2SiO_2 \cdot 0.9P_2O_5:Ce,Tb$, $LaPO_4:Ce,Tb$, $Y_2SiO_5:Ce,Tb$, $CeMgAl_{11}O_{19}:Tb$, and $Zn_2SiO_4:Mn$, red emitting phosphors activated by trivalent europium such as $Y_2O_3:Eu^{3+}$, $YVO_4:Eu^{3+}$, $Y(P,V)O_4:Eu^{3+}$, and $Y_2O_2S:Eu^{3+}$ and other rare-earth phosphors. As charge characteristics of phosphors or surface-treated phosphors, it is important in the present invention that their charging tendencies are negative relative to an oxide having the cation electronegativity $X_i$ of 7.0 but positive relative to an oxide having the $X_i$ of 11.8, that they are charged positive smaller than 3.0 $\mu$C per gram when they are in contact with the glass beads each having the particle size of 200–500 $\mu$m and that they are charged larger than $-0.5$ $\mu$C per gram when they are in contact with reduced iron powder having the particle size of 44–74 $\mu$m. Further, those materials in which the above-mentioned blue, green and red emitting phosphors are mixed in such a way that the color temperature becomes 2800–10000K can be used, and these cases meet the above-mentioned charge characteristics.

When the charge characteristics of inorganic compounds shown in FIG. 6 are taken into consideration, the charge characteristics of phosphors can be controlled in the scope of the present invention by coating their particle surfaces with those inorganic compounds whose charge characteristics are similar to HgO, that is, oxides such as $Al_2O_3$ and alkali rare-earth metal compounds such as $Ca_2P_2O_7$, $Sr_2P_2O_7$ and $Ba_2P_2O_7$.

When those phosphor particles whose surfaces are treated by inorganic compounds are to be used, it is desirable that the weight percent of each of the inorganic compounds contained in the phosphor is in a range of 0.01–5.0, more preferably 0.01–3.0. The effect of controlling the charging tendency of the phosphor is not sufficient when the amount of the inorganic compound attached to the phosphor particles is smaller than 0.01 weight % and the luminous efficiency of the phosphor is lowered when it exceeds 5.0 weight %.

Table 2 shows results obtained by measuring the charge characteristics of phosphors by the blow-off powder charge measuring device, said phosphors being coated (or mixed) with inorganic compounds at their particle surfaces.

TABLE 2

| Sample No. | Phosphor (Chemical formula) | Coating Materials | | |
|---|---|---|---|---|
| | | Inorganic Compound | Content (wt %) | Charge ($\mu C/g$) |
| 16 | $Sr_{10}(PO_4)_6Cl_2:Eu^{2+}$ | $Al_2O_3$ | 1.0 | 1.5 |
| 17 | $Y_2SiO_5:Ce,Tb$ | $Ca_2P_2O_7$ | 1.5 | 0.4 |
| 28 | $(La,Ce,Tb)PO_4$ | $Al_2O_3$ | 0.5 | 1.2 |
| 19 | $Zn_2SiO_4:Mn$ | $Al_2O_3$ | 1.0 | −0.5 |
| 20 | " | $Ca_2P_2O_7$ | 1.0 | 0.2 |
| 21 | " | $Sr_2P_2O_7$ | 1.0 | −0.3 |
| 22 | " | $Ba_2P_2O_7$ | 1.0 | 0.4 |
| 23 | $Y_2O_3:Eu^{3+}$ | $Al_2O_3$ | 1.0 | 1.8 |
| 24 | " | $Ca_2P_2O_7$ | 1.0 | 1.2 |
| 25 | $YVO_4:Eu^{3+}$ | $Al_2O_3$ | 1.0 | 0.1 |

A sample 17 shown in Table 2 is prepared by surface treating the sample 7 shown in Table 1, and a sample 28 shown in Table 2 is prepared by surface-treating the sample 6 shown in Table 1. As apparent from Table 2, it can be understood that the surface-treated phosphors have characteristics different from those phosphors not surface-treated shown in Table 1.

Figure 7:
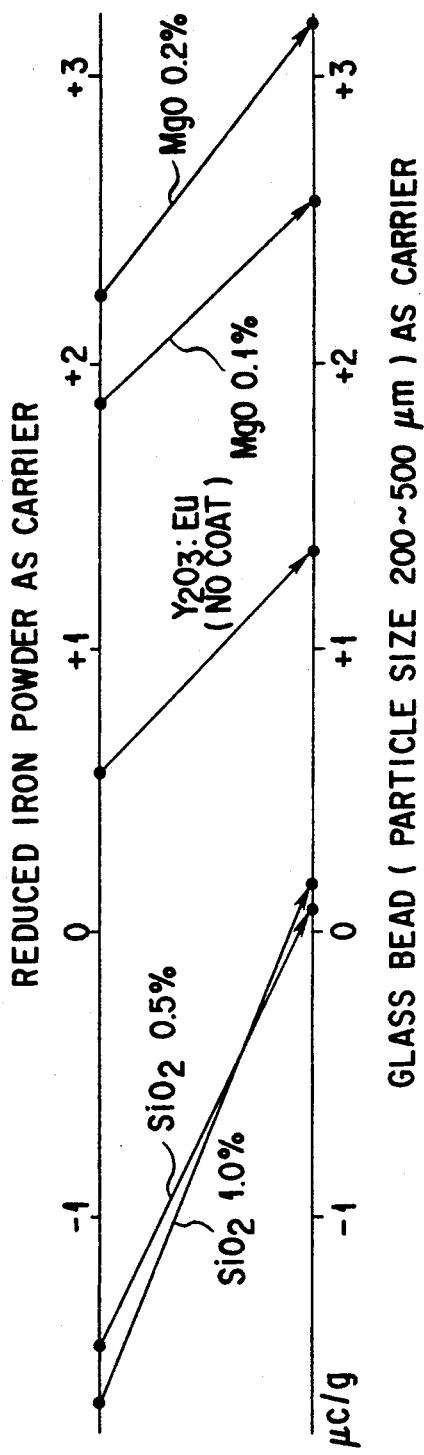
FIG. 7 shows the relation of charge values obtained when glass beads or particles of reduced iron powder are used as carrier according to the blow-off manner.

Charge amounts obtained when samples prepared by surface-coating the phosphor particles ($Y_2O_3:Eu$) with MgO or $SiO_2$ of 0.1-0.5 weight % were measured using the glass beads or reduced iron powder had a relationship as shown in FIG. 7. Although the measured values are different, depending upon the carrier used, a charging tendency with regard to the glass beads is similar to a charging tendency with regard to reduced iron powder, that is one tendency is merely shifted to another tendency.

It is preferable that metal oxide selected from the group of MgO, CaO, SrO, BaO and ZnO is used as the inorganic compound with which the phosphor particles are surface-coated. It is because metal ion electronegativities of these metal oxides are smaller than 7 and their surface charging tendencies are positioned properly more positive than that of HgO, so that the charging tendency of the surface of the phosphor can be controlled toward more positive by even a small coating amount, and that a they can be prevented from reacting with HgO to more effectively suppress the blackening of lamp. Further, the inorganic compound which is used to surface-treat the phosphors is selected by taking into consideration of charging tendency, chemical stability and light absorbability for ultraviolet and light emitted from the phosphors. Metal oxides such as alkaline earth elements, rare-earth elements including yttrium, aluminium and gallium each having an electronegativity smaller than 11 are charged positive relative to iron, and other metal oxides such as titanium, tantalum, and phosphorus each having an electronegativity larger than 11 are charged negative relative to iron. Needless to say, they can be used in the form of a mixture, if the total effect of the surface treatment brings the phosphor charging tendency into the proper region and meets to other conditions such as chemical stability, etc., as mentioned above.

The fluorescent lamp, particularly of the high load type having an inner wall load of 500-2000 W/m², is liable to be blackened because mercury and its oxides are adsorbed on the phosphor layer of the lamps, as described above. When the charging tendency of the phosphor particles which form the phosphor layer of the lamp is negative relative to an oxide having the cation electronegativity $X_i$ of 7.0 but positive relative to an oxide having the electronegativity $X_i$ of 11.8, these phosphor particles are charged positive and smaller than 3.0 $\mu C$ per gram at the time of their contact with the soda lime glass beads each having the particle size of 200-500 $\mu m$, and they are charged positive and larger than −0.5 $\mu C$ gram at the time of their contact with the reduced iron powder particles each having the particle size of 44-74 $\mu m$, therefore, the blackening of the lamp can be suppressed with higher reliability and reproducibility.

Various examples of the present invention will be set forth below.

Example 1

Samples Nos. 1, 3, 5, 6, 8, 12, 13, 22, 24 and 25 shown in Tables 1 and 2 were selected and their phosphor particles were dispersed into a solvent in which a binder was solved to prepare slurries.

Figure 8:
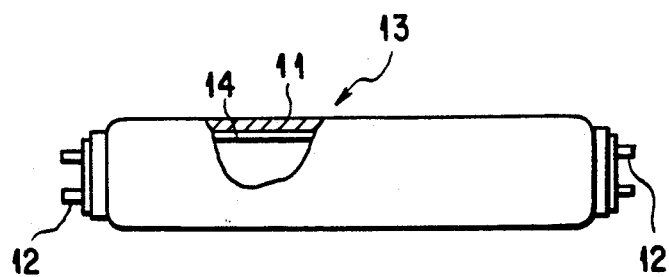
FIG. 8 a structure of the low pressure mercury lamp according to the present invention.

Fluorescent lamps each shaped like a straight tube shown in FIG. 8 were made using the phosphor slurries. As shown in FIG. 8, the slurry including one of the phosphors was coated on the inner wall of each of straight glass tubes 11 and baking and exhausting steps were applied to the glass tubes 11 after they were dried to form a phosphor layer 14 on the inner wall of each of the glass tubes 11. Sealing gases including mercury were then filled in each of the glass tubes 11 and both ends of each of the glass tubes 11 were sealed by caps 12 in which lighting circuits were housed. These glass tubes 11 were then aging-treated. Each of the fluorescent lamps thus prepared is so arranged that electrodes (not shown) are attached to both ends of the glass tube 11 and that the phosphor layer 14 in the glass tube 11 is made luminous by absorbing ultraviolet rays generated from mercury excited when predetermined voltage is added to the electrodes through the caps 12. Fluorescent lamps 13 of the straight tube type each having an inner wall load of 700 W/m², a diameter of 25 mm and a length of 1200 mm were made in this manner. The following evaluation was made for the lamps prepared.

Evaluation of Lamp Blackening

In order to check the occurrence of lamp blackening due to the adsorption of Hg while the fluorescent lamps were lighting, an enforced lighting test was applied to the lamps at a high load, that is, by a 30-second cycle of ON—OFF method according to the life test defined in JIS C 7601. The lighting life test which usually takes 1000-2000 hours can be shortened to about 10 hours by using this 30-second cycle ON—OFF method. JIS is an abridgment of "Japanese Industrial Standards" which unifies and standardizes matters relating to techniques and products in the mining and industrial fields.

The lamp blackening due to the adsorption of Hg was evaluated as follows: Those lamps which had no blackening just after their lighting (zero hour) were evaluated as point 10. The lamps which has been lighted for predetermined hours were evaluated over ten step values from practical viewpoints. What the lamps had the blackening just after zero hour means that they had already been blackened before their lighting or at the aging process.

The evaluation steps are roughly shown as follows:
Points 10-9—No problem.
Points 8-7—Usable but having problem in appearance.

Points 6–5—Bad in appearance and luminous flux lowered.

Points 4–3—Bad in appearance and difficult to light.

Points 2–1—Neither lighted nor used.

Results obtained by evaluating the lamp blackening as described above are shown in Table 3. The blow-off powder charge measuring device shown in FIG. 2 and the glass beads which served as the carrier were used to measure charge amounts of the phosphors used in the lamps. Results thus obtained are also shown in Table 3.

Example 2

Figure 9:
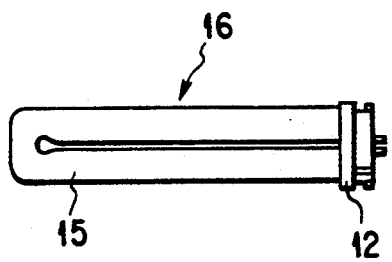
FIG. 9 shows another structure of the fluorescent lamp according to the present invention.

Fluorescent lamps 16 each shaped like a letter U as shown in FIG. 9 were made using the same phosphor matters as in Example 1. A phosphor layer was formed on the inner wall of each of U-shaped glass tubes 15 in the same way as in Example 1 and filling gases including mercury were filled in the glass tube 15. Both ends of the glass tube 15 were then sealed by the cap 12 in which a lighting circuit was housed. The U-shaped fluorescent lamps 16 each having an inner wall load of 1000 W/m$^2$, a length of 410 mm and diameter of 20 mm were prepared in this manner and the same blackening evaluation and charge amount measurement as in Example 1 were made. Results thus obtained are shown in Table 4.

Example 3

Figure 10:
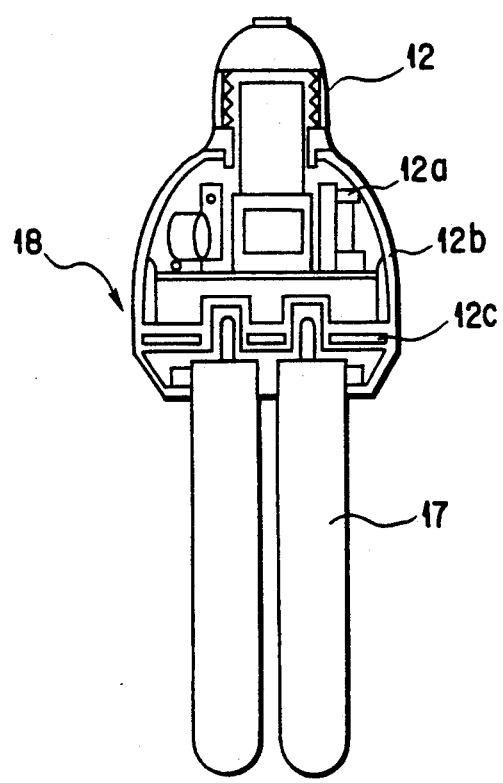
FIG. 10 shows a further structure of the fluorescent lamp according to the present invention.

Same phosphor matters as in Example 1 were used and a phosphor layer was formed on the inner wall of each of curved glass tubes 17 in the same manner as in Example 1. Curved fluorescent lamps 18 shown in FIG. 10 were thus prepared. As shown in FIG. 10, each of the curved fluorescent lamps 18 is so arranged that filling gases including mercury are filled in the curved glass tube 17 o the inner wall of which the phosphor layer is formed and that one end of the glass tube 17 is sealed by the cap 12 in which the lighting circuit is housed. The fluorescent lamps 18 of the compact type each having an inner wall load of 1500 W/m were prepared in this manner and the blackening evaluation was made in the same way as in Example 1. In FIG. 10, numeral 12a represents an electronic lighting circuit, 12b a power source case and 12c a heat insulating substrate.

Comparison Examples 1–3 shown in Tables 1–3 represent those fluorescent lamps which were made under same conditions as in the above-described Examples, using phosphor matters selected from samples 1–13 in Table 1 and samples 16–25 in Table 2, said selected phosphor matters having negative charge or being positioned in the electrication (charging) series remote from HgO. Same blackening evaluation and charge amount measurement were made for these Comparison Examples thus prepared.

TABLE 3

| | Kind of Phosphor Matter | | Charge ($\mu$C/g) | Type of Lamp | Blackening Evaluation Result | | | |
|---|---|---|---|---|---|---|---|---|
| | | | | | 0 Hour Evaluation value | 10 Hours Evaluation value | 30 Hours Evaluation value | 100 Hours Evaluation value |
| | Sample No. | Chemical Formula | | | | | | |
| Example 1 | | | | | | | | |
| 1 | 1 | BaMg$_2$Al$_{16}$O$_{27}$:Eu$^{2+}$ | 1.5 | Straight Tube | 10 | 9 | 8 | 7 |
| 2 | 3 | (Sr,Ca,Ba)$_{10}$(PO$_4$)$_6$Cl$_2$:Eu$^{2+}$ | 1.6 | Straight Tube | 10 | 9 | 7 | 6 |
| 3 | 5 | La$_2$O$_3$.0.2SiO$_2$.0.9P$_2$O$_5$:Ce,Tb | 0.7 | Straight Tube | 10 | 8 | 7 | 5 |
| 4 | 6 | (La,Ce,Tb)PO$_4$ | 0.8 | Straight Tube | 10 | 8 | 7 | 6 |
| 5 | 8 | (Ca,Mg)Al$_{11}$O$_{19}$:Tb | 1.1 | Straight Tube | 10 | 9 | 8 | 7 |
| 6 | 12 | Y(P,V)O$_4$:Eu$^{3+}$ | 1.4 | Straight Tube | 10 | 9 | 7 | 6 |
| 7 | 13 | Y$_2$O$_2$S:Eu$^{3+}$ | 0.7 | Straight Tube | 10 | 8 | 6 | 5 |
| 8 | 22 | Zn$_2$SiO$_4$:Mn(Ba$_2$P$_2$O$_7$) | 0.4 | Straight Tube | 10 | 8 | 6 | 5 |
| 9 | 24 | Y$_2$O$_3$:Eu$^{3+}$(Ca$_2$P$_2$O$_7$) | 1.2 | Straight Tube | 10 | 9 | 7 | 6 |
| 10 | 25 | YVO$_4$:Eu$^{3+}$(Al$_2$O$_3$) | 0.1 | Straight Tube | 10 | 7 | 5 | 5 |
| Comparison Example 1 | | | | | | | | |
| 1 | 7 | Y$_2$SiO$_5$:Ce,Tb | −0.5 | Straight Tube | 7 | 3 | 1 | — |
| 2 | 9 | Zn$_2$SiO$_4$:Mn | −2.8 | Straight Tube | 5 | 2 | — | — |
| 3 | 15 | Zn$_3$(PO$_4$)$_2$:Mn | −2.5 | Straight Tube | 5 | 1 | — | — |

TABLE 4

| Sample No. | Kind of Phosphor Matter | | Charge ($\mu C/g$) | Type of Lamp | Blackening Evaluation Result | | | |
|---|---|---|---|---|---|---|---|---|
| | | | | | 0 Hour Evaluation value | 10 Hours Evaluation value | 30 Hours Evaluation value | 100 Hours Evaluation value |
| | No. | Chemical Formula | | | | | | |
| Example 2 | | | | | | | | |
| 1 | 1 | $BaMg_2Al_{16}O_{27}:Eu^{2+}$ | 1.5 | Straight Tube | 10 | 9 | 8 | 6 |
| 2 | 3 | $(Sr,Ca,Ba)_{10}(PO_4)_6Cl_2:Eu^{2+}$ | 1.6 | Straight Tube | 10 | 9 | 7 | 5 |
| 3 | 5 | $La_2O_3.0.2SiO_2.0.9P_2O_5:Ce,Tb$ | 0.7 | Straight Tube | 10 | 7 | 7 | 5 |
| 4 | 6 | $(La,Ce,Tb)PO_4$ | 0.8 | Straight Tube | 10 | 8 | 8 | 6 |
| 5 | 8 | $(Ca,Mg)Al_{11}O_{19}:Tb$ | 1.1 | Straight Tube | 10 | 9 | 7 | 6 |
| 6 | 12 | $Y(P,V)O_4:Eu^{3+}$ | 1.4 | Straight Tube | 10 | 9 | 7 | 5 |
| 7 | 13 | $Y_2O_2S:Eu^{3+}$ | 0.7 | Straight Tube | 10 | 8 | 6 | 5 |
| 8 | 22 | $Zn_2SiO_4:Mn(Ba_2P_2O_7)$ | 0.4 | Straight Tube | 10 | 8 | 6 | 5 |
| 9 | 24 | $Y_2O_3:Eu^{3+}(Ca_2P_2O_7)$ | 1.2 | Straight Tube | 10 | 9 | 6 | 5 |
| 10 | 25 | $YVO_4:Eu^{3+}(Al_2O_3)$ | 0.1 | Straight Tube | 10 | 7 | 5 | 5 |
| Comparison Example 2 | | | | | | | | |
| 1 | 7 | $Y_2SiO_5:Ce,Tb$ | −0.5 | Straight Tube | 6 | 2 | — | — |
| 2 | 11 | $YVO_4:Eu^{3+}$ | −1.5 | Straight Tube | 6 | 3 | 2 | — |
| 3 | 14 | $3.5MgO.0.5MgF_2.GeO_2:Mn$ | 3.3 | Straight Tube | 7 | 3 | 1 | — |

TABLE 5

| Sample No. | Kind of Phosphor Matter | | Charge ($\mu C/g$) | Type of Lamp | Blackening Evaluation Result | | | |
|---|---|---|---|---|---|---|---|---|
| | | | | | 0 Hour Evaluation value | 10 Hours Evaluation value | 30 Hours Evaluation value | 100 Hours Evaluation value |
| | No. | Chemical Formula | | | | | | |
| Example 3 | | | | | | | | |
| 1 | 1 | $BaMg_2Al_{16}O_{27}:Eu^{2+}$ | 1.5 | Straight Tube | 10 | 8 | 7 | 5 |
| 2 | 3 | $(Sr,Ca,Ba)_{10}(PO_4)_6Cl_2:Eu^{2+}$ | 1.6 | Straight Tube | 10 | 8 | 7 | 5 |
| 3 | 5 | $La_2O_3.0.2SiO_2.0.9P_2O_5:Ce,Tb$ | 0.7 | Straight Tube | 10 | 6 | 6 | 5 |
| 4 | 6 | $(La,Ce,Tb)PO_4$ | 0.8 | Straight Tube | 10 | 7 | 6 | 6 |
| 5 | 8 | $(Ca,Mg)Al_{11}O_{19}:Tb$ | 1.1 | Straight Tube | 10 | 8 | 7 | 5 |
| 6 | 12 | $Y(P,V)O_4:Eu^{3+}$ | 1.4 | Straight Tube | 10 | 7 | 7 | 5 |
| 7 | 13 | $Y_2O_2S:Eu^{3+}$ | 0.7 | Straight Tube | 10 | 7 | 5 | 5 |
| 8 | 22 | $Zn_2SiO_4:Mn(Ba_2P_2O_7)$ | 0.4 | Straight Tube | 10 | 8 | 6 | 5 |
| 9 | 24 | $Y_2O_3:Eu_3+(Ca_2P_2O_7)$ | 1.2 | Straight Tube | 10 | 8 | 6 | 5 |
| 10 | 25 | $YVO_4:Eu^{3+}(Al_2O_3)$ | 0.1 | Straight Tube | 10 | 6 | 5 | 5 |
| Comparison Example 3 | | | | | | | | |
| 1 | 7 | $Y_2SiO_5:Ce,Tb$ | −0.5 | Straight Tube | 5 | 1 | — | — |
| 2 | 11 | $YVO_4:Eu^{3+}$ | −1.5 | Straight Tube | 5 | 1 | — | — |
| 3 | 14 | $3.5MgO.0.5MgF_2.GeO_2:Mn$ | 3.3 | Straight Tube | 5 | 1 | — | — |

As apparent from Tables 3, 4 and 5, the fluorescent lamps shown as Comparison Examples 1-3 and in which phosphor materials having negative charge or being positioned in the electrification (charging) series remote from HgO were used were more liable to be blackened. In the case of the fluorescent lamps of the present invention shown as Examples 1-3 and in which the surface charge characteristic of phosphor particles used was defined, however, it was found that the occurrence of blackening could be suppressed for a longer time and that their luminous flux lowering rates could be made smaller accordingly.

EXAMPLE 4

1.10 g of magnesium nitrate ($Mg(NO_3)_2$) was dissolved in pure water of 200 cc and 100 g of rare earth aluminate-silica-phosphate green emitting phosphor activated by cerium and terbium (($La_{0.06}Ce_{0.25}Tb_{0.15}$)$_2O_3$ $0.003Al_2O_3$ $0.0005SiO_2$ $1.003P_2O_5$) was added to the solution, and thus prepared suspension solution was stirred.

While the stirring pH of the solution was adjusted to alkali area by adding ammonia water ($NH_4OH$) to produce magnesium hydroxide gel in the solution. After further fully stirring it under this state, the phosphor was washed several times by pure water using the decantation method and its suspension was filtered by means of suction. A cake like residue thus obtained was dried at a temperature of 300°-400° C. and a surface-treated phosphor was thus obtained.

The phosphor particles thus obtained were surface-coated with MgO colloidal poaricles of 0.3 weight %. A 4 W fluorescent lamps (inner diameter; 15.5 mm, inner wall load: 1100 W/$m^2$) shown in FIG. 8 was made as usual, using the green emitting phosphor. Its initial luminous output, that after it was lighted for 1000 hours and the coloration (blackening) of its phosphor layer were measured and evaluated. Results thus obtained are shown in Table 6.

On the other hand, the rare earth ulmic alminate-silica-phosphate green emitting phosphor activated by cerium and terbium and used by the above-mentioned Example was used without being coated with any of metal oxides, and the same fluorescent lamp of the straight tube type was prepared. Its characteristics were measured under the same conditions as in the above Example. Both of the initial luminous output and that after 1000-hour lighting thus measured for the surface coated phosphor are shown as relative values when each value of the phosphor without being coated (Comparison Sample) is expressed as 100%. As the blackening of the lamp tube becomes lighter, its evaluation value is taken higher up to its maximum point 10.

The luminous output after 1000-hour lighting in the case of our Example was 110%, as compared with that of the phosphor without being surface coated (Comparison Sample). The blackening of the lamp tube in the case of the Comparison Sample was 6.0 but it was 9.0 in the case of our Example. The quality of the lamp according to the invention could be thus improved. The initial luminous output was not largely lowered but kept substantially the same as that of the Comparison Sample.

EXAMPLE 5

1.0 g of zinc oxide (ZnO) fine powder (particle size: about 0.05 μm) was put into pure water of 200 cc and fully suspended. 100 g of rare earth silica-borate-phosphate green emitting phosphor activated by cerium and terbium (($La_{0.04}Ce_{0.45}Tb_{0.15}$)$_2O_3$ $0.001SiO_2$ $0.988P_2O_5$ $0.0005B_2O_5$) was then added to the suspension and fully stirred. Acryl emulsion 0.1 g and poly acrylic acid ammonium 0.05 g were successively added to it and uniformly dispersed. The suspension thus prepared was then filtered by means of suction and a cake-like residue was dried at about 120° C. Phosphor-particles thus prepared were surface-coated by colloidal ZnO particles of 1.0 weight %.

Using this green emitting phosphor, a fluorescent lamp was made in the same way as in Example 4 and its characteristic were measured and evaluated under the same conditions as in Example 4. Results thus obtained are shown in Table 6.

A Comparison Sample shown in Table 6 represents a fluorescent lamp which was made under the same condition as in Example 4 but using the green-emitting phosphor without being coated with any of metal oxide particles.

TABLE 6

| | | Metal Oxide (MO) | | Initial Luminous Outout (Relative Value, %) | Luminous Output after 1000-Hour (Relative Value, %) | Blackening after 1000-Hour Lighting | |
|---|---|---|---|---|---|---|---|
| | Phosphor | Composition | Concentration (Weight %) | | | Example | Comparison Sample |
| Example | | | | | | | |
| 4 | $La_{0.60}Ce_{0.25}Tb_{0.15})_2O_3$·$0.003Al_2O_3$·$0.0005SiPO_2$·$1.003P_2O_5$ | $Mg_{1.00}$ | 0.30 | 99.5 | 110 | 9.0 | 6.0 |
| 5 | $(La_{0.40}Ce_{0.45}Tb_{0.15})_2O_3$·$0.001SiO_2$·$0.988P_2O_5$·$0.0005B_2O_3$ | $Zn_{1.00}$ | 1.00 | 99.5 | 112 | 9.0 | 6.5 |
| 6 | $(La_{0.40}Ce_{0.45}Tb_{0.15})_2O_3$·$0.995P_2O_5$·$0.00003B_2O_3$ | $Mg_{0.80}$ $Zn_{0.20}$ | 0.01 | 100.0 | 105 | 8.5 | 6.5 |
| 7 | $(La_{0.70}Ce_{0.20}Tb_{0.10})_2O_3$·$0.997P_2O_5$ | $Mg_{0.70}$ $Ca_{0.30}$ | 0.50 | 99.5 | 108 | 9.5 | 6.0 |
| 8 | $(La_{0.30}Ce_{0.60}Tb_{0.10})_2O_3$·$1.010P_2O_5$·$0.000005B_2O_3$ | $Ca_{1.00}$ | 0.08 | 100.0 | 108 | 9.0 | 6.5 |
| 9 | $(La_{0.55}Gd_{0.20}Ce_{0.15}Tb_{0.10})_2O_3$·$1.105P_2O_5$ | $Mg_{0.90}$ $Sr_{0.10}$ | 0.10 | 99.5 | 108 | 9.0 | 6.0 |
| 10 | $(La_{0.20}Y_{0.10}Gd_{0.10}Ce_{0.45}Tb_{0.15})_2O_3$·$0.05SiO_2$·$0.995P_2O_5$ | $Sr_{1.00}$ | 0.03 | 100 | 107 | 9.0 | 6.5 |
| 11 | $(La_{0.30}Ce_{0.60}Tb_{0.10})_2O_3$·$0.0001SiO_2$·$1.015P_2O_5$·$0.006B_2O_3$ | $Ba_{1.00}$ | 2.00 | 99.0 | 112 | 9.5 | 6.5 |
| 12 | $(La_{0.90}Ce_{0.05}Tb_{0.05})_2O_3$·$0.0002Al_2O_3$·$1.150P_2O_5$ | $Zn_{0.65}$ $Sr_{0.35}$ | 0.80 | 99.5 | 110 | 9.0 | 6.0 |
| 13 | $(La_{0.50}Ce_{0.35}Tb_{0.15})_2O_3$· | $Mg_{0.70}$ | 0.30 | 99.5 | 109 | 9.0 | 6.5 |

TABLE 6-continued

| | Phosphor | Metal Oxide (MO) Composition | Metal Oxide (MO) Concentration (Weight %) | Initial Luminous Outout (Relative Value, %) | Luminous Output after 1000-Hour (Relative Value, %) | Blackening after 1000-Hour Lighting Example | Blackening after 1000-Hour Lighting Comparison Sample |
| --- | --- | --- | --- | --- | --- | --- | --- |
| | 0.0005SiO$_2$.0.800P$_2$O$_5$ | Ca$_{0.10}$ Sr$_{0.20}$ | | | | | |
| 14 | (La$_{0.40}$Gd$_{0.20}$Ce$_{0.25}$Tb$_{0.15}$)$_2$O$_3$· 0.01Al$_2$O$_3$.0.006SiO$_2$.0.995P$_2$O$_5$ | Mg$_{0.60}$ Ba$_{0.40}$ | 3.00 | 90.0 | 112 | 10.0 | 6.5 |
| 15 | (Ce$_{0.65}$Tb$_{0.35}$)MgAl$_{11}$O$_{19}$ | Zn$_{0.85}$ Ba$_{0.15}$ | 0.05 | 99.5 | 108 | 9.0 | 6.5 |
| Comparison Example | | | | | | | |
| 4 | (La$_{0.60}$Ce$_{0.25}$Tb$_{0.15}$)$_2$O$_3$· 0.003Al$_2$O$_3$.0.0005SiO$_2$. 1.003P$_2$O$_5$ | Mg$_{1.00}$ | 5.00 | 92.0 | 109 | 10.0 | 6.0 |
| 5 | (La$_{0.70}$Ce$_{0.20}$Tb$_{0.10}$)$_2$O$_3$· 0.997P$_2$O$_5$ | Sr$_{1.00}$ | 0.0005 | 100.0 | 101 | 6.5 | 6.0 |

EXAMPLES 6–16

Green emitting phosphors were prepared in the same manner as in Example 4 while changing the kind of green emitting phosphor as well as the kind and the concentration of that metal oxide by which the green emitting phosphor was to be coated. Using green emitting phosphors thus prepared, fluorescent lamps were made and the same characteristic evaluations were conducted. Results thus obtained are shown in Table 6.

COMPARISON EXAMPLES 4 AND 5

Using phosphors which have the same in composition as those in Examples 4 and 7, green emitting phosphors were prepared in the way same as in Example 4 but different in that the amount of metal oxide particles attached to the phosphors were set smaller than 0.01 weight % or larger than 3.0 weight %. Fluorescent lamps were made using the green emitting phosphors thus prepared, and the same characteristic evaluations were made about the lamps.

In the case of the fluorescent lamps of the high load type (higher than 500 W/m$^2$) in which the phosphors shown as Examples were used, the lowering of their luminous outputs after their long time lighting can be reduced while keeping their initial luminous outputs substantially the same as those of the conventional ones, and the blackening of the fluorescent lamps can also be suppressed, as apparent from Table 6. Further, it is found that better effect can be achieved when the amount of metal oxides surface-attached to the phosphors is in a range of 0.01–1.0 weight %.

EXAMPLE 17

100 g of yttrium oxide red emitting phosphor activated by europium having an average particle size of 4.2 μm was suspended in pure water. To the phosphor suspension thus made was added 1 ml of another suspension which was made by adding 1 weight % of colloidal magnesium oxide particles (BAIKALOX M120 made by Baikowski Corporation) to pure water, and after it was stirred over 30 minutes, it was filtered by means of suction and dried at 125° C. A cake like residue thus obtained was further baked in air at 350° C. for 5 hours. A phosphor thus surface-treated was obtained.

When the phosphor particles thus obtained were observed through the scanning electron microscope, it was confirmed that MgO colloid particles were well distributed and attached on the surface of each of the phosphor particles.

0.4 g of the phosphor thus obtained and the reduced iron powder (TEFV made by NIPPON TETSUFUN Corporation) having the particle size of 74–44 μm were mixed with each other and when the contact charge amount of the phosphor against to the iron powder was measured by the blow-off device, it was +0.9 μC/g.

The phosphor was dispersed in solution in which a binding agent such as nitrocellulose was contained to prepare a slurry. This slurry including the phosphor was coated to a certain thickness on the inner wall of a straight glass tube having an inner diameter of 10 mm and after it was dried, baking process was applied to it to remove the binder from it. Mercury and filling gas were filled in the glass tube and both ends of the glass tube were sealed by caps. A fluorescent lamp of the straight tube type having a length of 300 mm between its caps was thus made. The lamp was provided with a small pipe which served as the cooler portion of the lamp to enable excess mercury to condense thereon.

The luminous flux of the lamp reached its stationary value after about 30 seconds operation since the lamp was lighted. The luminous flux after 300-hour lighting measured relative to its initial value (maintenance value) was 90%. This result is shown in Table 7.

EXAMPLE 18

0.2 g of zinc hydroxide colloid which was prepared by adding 0.2 mol/l of ammonium solution and 0.1 mol/l of zinc sulfate solution instead of magnesium oxide in Example 17 was surface-attached to the red-emitting yttrium oxide phosphor particles activated by europium. Filtering and drying were applied to it in the same way as in Example 17 and a surface-treated phosphor was thus prepared. The zinc hydroxide colloid was changed to zinc oxide colloid by the drying process.

The contact charge of this phosphor against the iron powder was measured in the same manner as in Example 17. A fluorescent lamp was made according to the same process as in Example 17 and its characteristics were evaluated in the same manner as in Example 17. Results thus obtained are shown in Table 7.

COMPARISON EXAMPLE 6

Using yttrium oxide phosphor activated by europium but with no metal oxide attached to its particle surfaces, a fluorescent lamp was made in the same manner as in Example 17. The contact charge amount of this phosphor against the iron powder was 0.3 $\mu C/g$ and the luminous flux maintenance value of the lamp was 87%. These results are shown in Table 7.

COMPARISON EXAMPLES 7 AND 8

Silica colloid (OX-50 made by Japan Aerosil Corporation) instead of magnesium oxide colloid in Example 17 was attached to particle surfaces of the yttrium oxide phosphor activated by europium to prepare samples. Using these samples, fluorescent lamps were made in the same manner as in Example 17. Contact charge amounts of the phosphors and characteristics of the fluorescent lamps were evaluated in the same manner as in Example 17. Results thus obtained are shown in Table 7.

In the case of these Comparison Examples 6-8 or fluorescent lamps, it took 5-6 minutes that their luminous flux reached the stationary value after starting their lighting.

EXAMPLES 19-21

According to the same manner as in Examples 17-18, magnesium or zinc oxide was attached to particle surfaces of green emitting zinc silicate phosphor particle activated by manganese and having an average particle size of 5.7 $\mu m$. The amount of magnesium oxide or zinc oxide attached was changed as shown in Table 7 in this case. Using these phosphors, fluorescent lamps were made in the same manner as in Example 17 and contact charge amounts of the phosphors and characteristics of the fluorescent lamps were evaluated also in the same manner as in Example 17. Results thus obtained are shown in Table 7.

EXAMPLE 22

0.5 weight % of magnesium oxide colloid was firstly attached to particle surfaces of the green emitting zinc silicate phosphor activated by manganese to prepare a sample. 0.2 weight % of silica colloid was then attached to this sample. Using a phosphor thus prepared, a fluorescent lamp was made in the same manner as in Example 17 and the contact charge amount of the phosphor and characteristics of this lamp were evaluated also in the same way as in Example 17. Results thus obtained are shown in Table 7.

COMPARISON EXAMPLES 9 AND 10

Silica colloid was attached to particle surfaces of the green emitting zinc silicate phosphor activated by manganese to prepare a phosphor sample whose contact charge amount against to the iron powder was out of the range of the present invention. Using this phosphor sample, fluorescent lamps were made in the same way as in Example 17 and contact charge amounts of the phosphors and characteristics of the fluorescent lamps were evaluated also in the same manner as in Example 17. Results thus obtained are shown in Table 7.

TABLE 7

|  | Phosphor | Metal Oxide Composition | Concentration (Weight %) | Charge ($\mu C/g$) | Luminous Flux Maintenance Value (%) |
| --- | --- | --- | --- | --- | --- |
| Example |  |  |  |  |  |
| 16 | $Y_2O_3$:Eu | MgO | 0.1 | +0.9 | 90 |
| 17 | $Y_2O_3$:Eu | ZnO | 0.5 | −1.3 | 90 |
| 18 | $Zn_2SiO_4$:Mn | MgO | 0.1 | +0.2 | 67 |
| 19 | $Zn_2SiO_4$:Mn | MgO | 0.2 | +0.6 | 63 |
| 20 | $Zn_2SiO_4$:Mn | ZnO | 0.1 | −0.2 | 62 |
| 21 | $Zn_2SiO_4$:Mn | $MgO/SiO_2$ | 0.5/0.2 | +0.5 | 65 |
| Comparison Example |  |  |  |  |  |
| 6 | $Y_2O_3$:Eu |  |  | −0.3 | 87 |
| 7 | $Y_2O_3$:Eu | $SiO_2$ | 0.5 | −1.1 | 58 |
| 8 | $Y_2O_3$:Eu | $SiO_2$ | 1.0 | −1.4 | 46 |
| 9 | $Zn_2SiO_4$:Mn |  |  | −0.6 | 59 |
| 10 | $Zn_2SiO_4$:Mn | $SiO_2$ | 0.5 | −0.8 | 53 |

When colloidal metal oxide particles are attached to surfaces of phosphor particles and charging tendency of the phosphors are controlled in such a way that their contact charge amounts against the reduced iron powder having the particle size of 44–74 $\mu m$ are in a range of −0.5 to 1.5 $\mu C/g$, it is understood from Table 7 that the occurrence of blackening and the luminous flux lowering in the high load type fluorescent lamps can be suppressed.

Yttrium oxide activated by europium and charged positive against the iron powder and zinc silicate phosphor activated by manganese and charged negatively against the iron powder were cited as the phosphors used in the above-described Examples and Comparison Examples. Further, magnesium oxide and zinc oxide charged positively against the iron powder and silica charged negatively against the iron powder were cited as the surface-attaching metal oxides. It is understood from these Examples that the charging tendency of each of the phosphors can be changed toward that of the surface-attaching metal oxide used or that the charging tendency of each of the phosphors can be controlled by selecting proper kind and amount of the surface-attaching metal oxide used.

EXAMPLE 23

Figure 11:
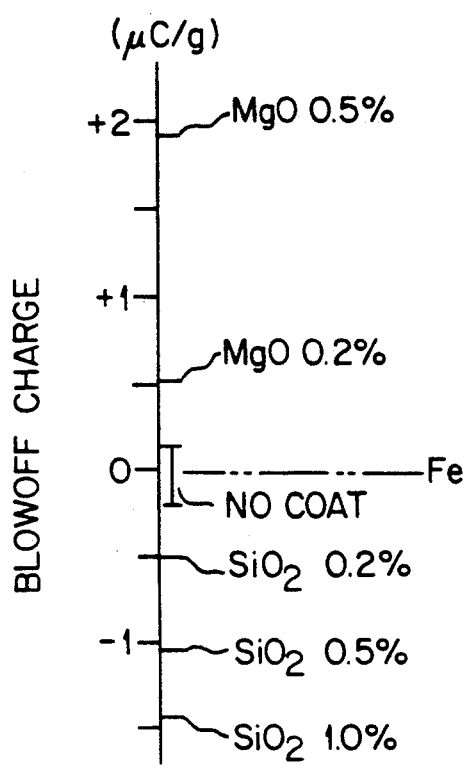
FIG. 11 shows the charge of samples obtained by the blow-off manner when reduced iron powder is used as the carrier.
Figure 12:
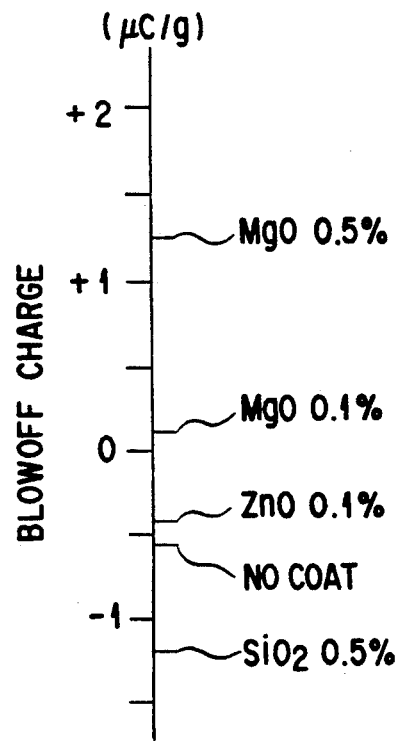
FIG. 12 shows the charge of another sample obtained by the blow-off manner when reduced iron powder is used as the carrier.

(La, Ce, Tb)(P, Si)O4 and $Zn_2SiO_4$:Mn were selected as phosphors and MgO and ZnO were selected as metal oxides charged positively while $SiO_2$ as a metal oxide charged negatively. Suspensions of the phosphors were added to those of the metal oxides and they were stirred, filtered by means of suction, dried at a temperature higher than 125° C., baked at 350° C. and passed through the 200-mesh net filter. Their particle charge amounts against the iron powder which was used as the carrier were measured by the blow-off charge measuring device. Results thus obtained are shown in FIGS. 11 and 12. FIG. 11 shows results obtained in the case of (La, Ce, Tb)(P, Si)O4 and FIG. 12 results obtained in the case of $Zn_2SiO_4$:Mn. As apparent from FIGS. 11 and 12, charging tendency charge trends of the phosphors can be controlled in a significantly wide range when particle surfaces of the phosphors are coated with the metal oxides.

Figure 13:
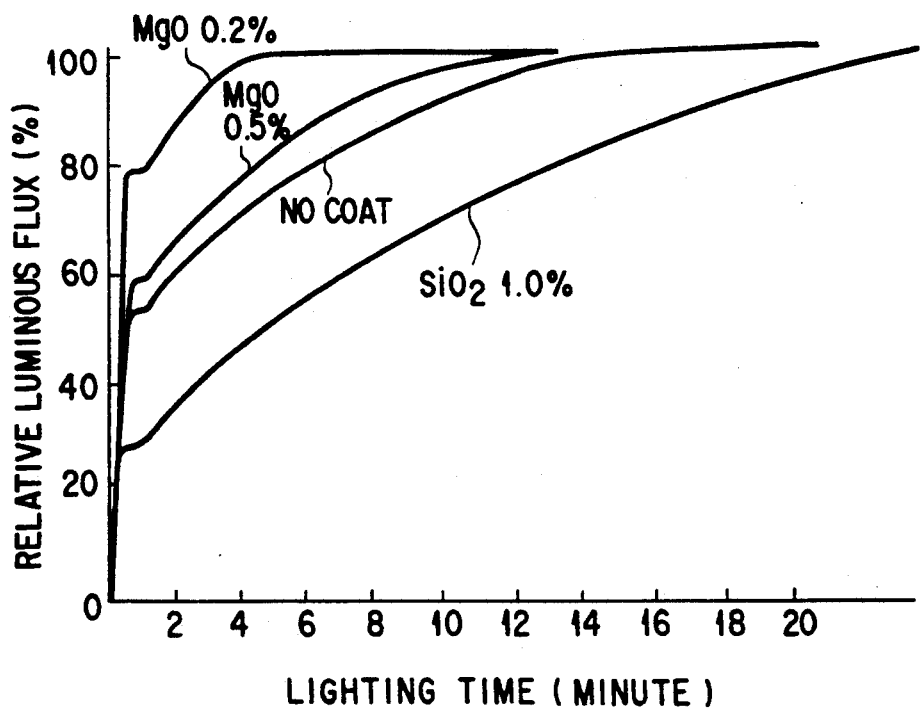
FIG. 13 is a graph showing the relation between the luminous flux rate of a fluorescent lamp and the lighted time thereof after the lamp is kept lighting over 24 hours.
Figure 14:
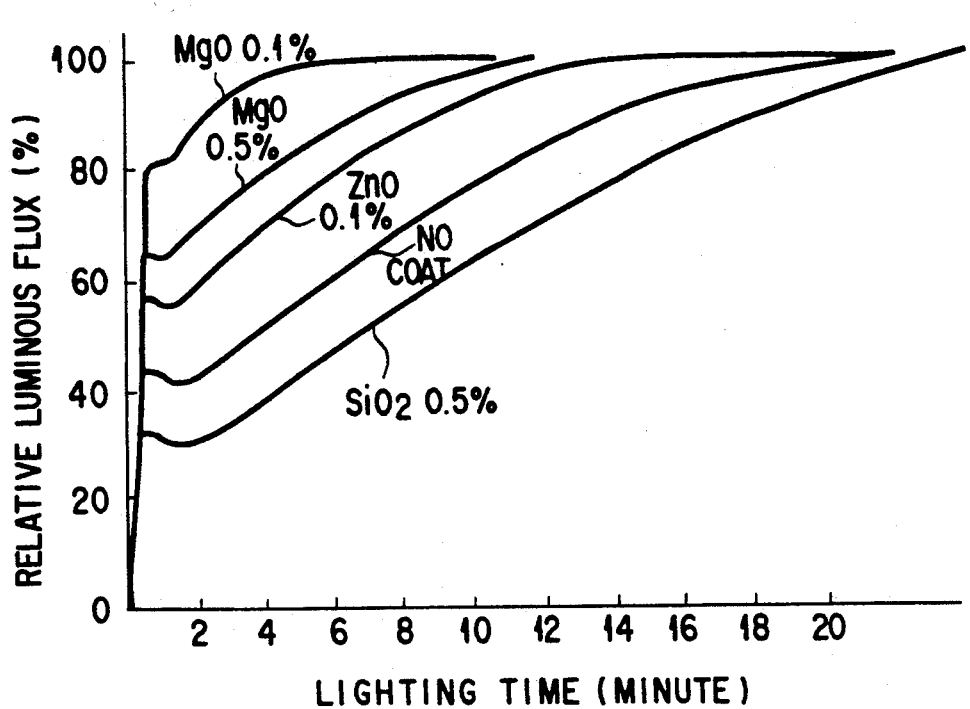
FIG. 14 is a graph showing the relation between the relative luminous flux of another fluorescent lamp and the lighted time thereof after the lamp is kept lighted over 24 hours.

Fluorescent lamps were made in the same manner as in Example 17, using the surface-treated phosphors and after they were kept on for 100 hours and then put off over 24 hours, the rising of their luminous fluxes at early stage of the lighting was measured. Results thus obtained are shown in FIGS. 13 and 14. FIG. 13 shows results obtained in the case of (La, Ce, Tb)(P, Si)O4 and FIG. 14 results obtained in the case of $Zn_2SiO_4$:Mn.

Figure 15:
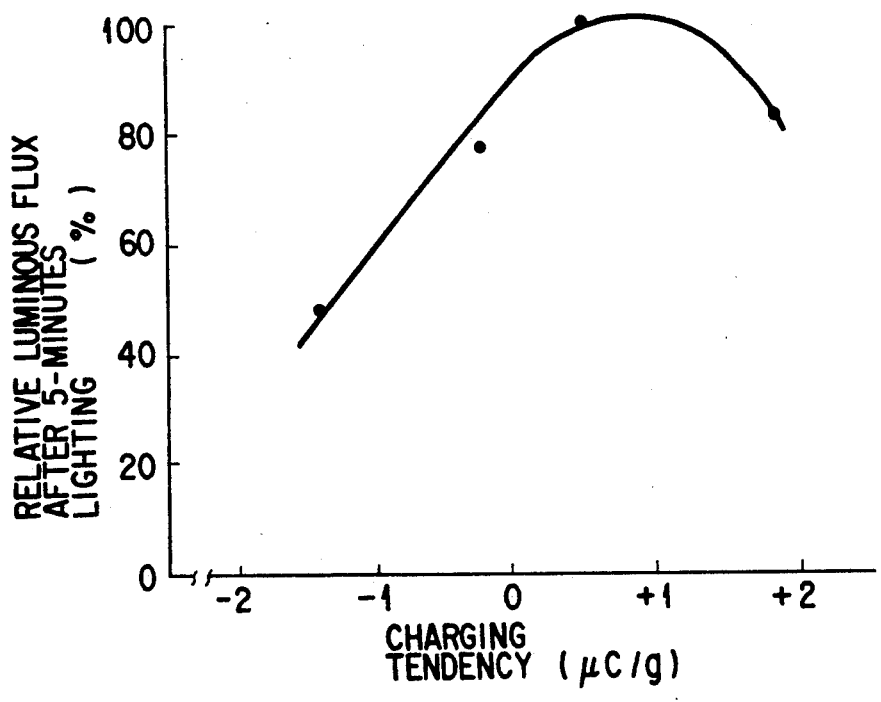
FIG. 15 is a graph showing the relation between the relative luminous flux of the fluorescent lamp and the charge tendency of the phosphor after the lamp is lighted for five minutes.
Figure 16:
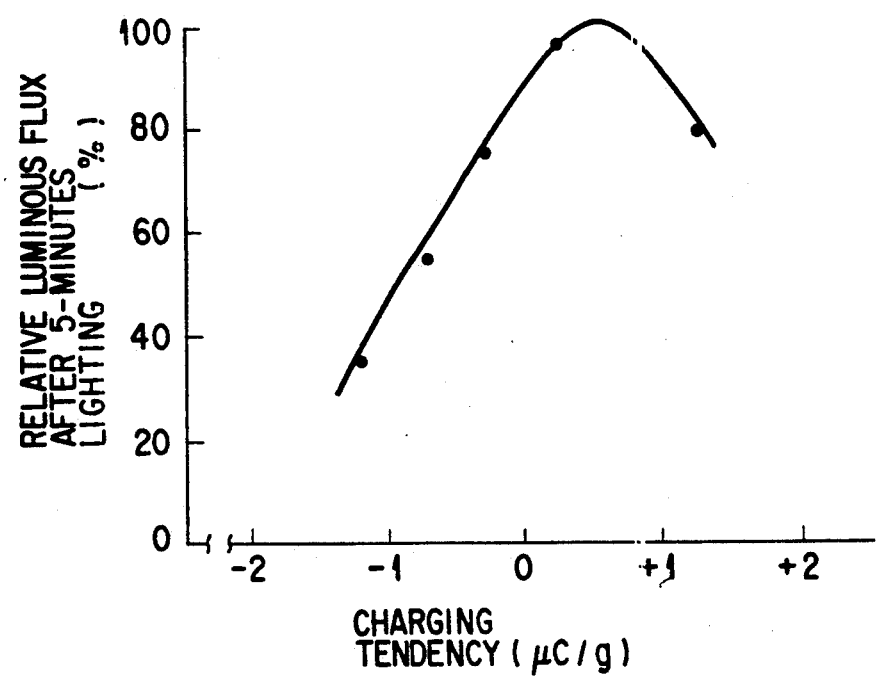
FIG. 16 is a graph showing the relation between the relative luminous flux rate of the other lamp and the charging tendency of the other phosphor after the lamp is lighted for five minutes.

The relation between relative luminous flux and charging tendency was measured for these fluorescent lamps after five minutes after they were turned on. Results thus obtained are as shown in FIGS. 15 and 16. FIG. 15 shows results obtained in the case of (La, Ce, Tb)(P, Si)O4 and FIG. 16 results obtained in the case of $Zn_2SiO_4$;Mn.

As is apparent from these Figures, the rising of luminous flux depended upon the charging tendency of the phosphor used and the best condition was when the charging tendency of the phosphor used relative to the iron powder was in a range of 0–+1 $\mu$C/g in the case of these phosphors.

Figure 17:
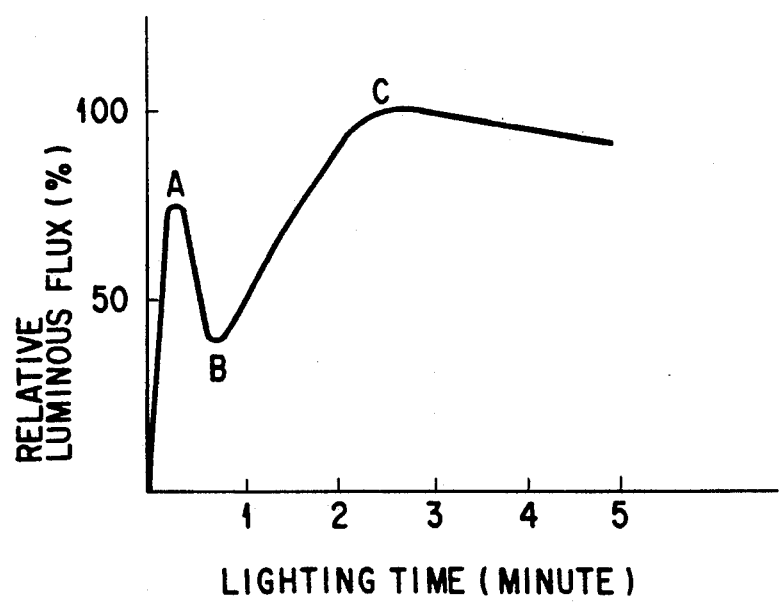
FIG. 17 is a graph showing the relation between the relative luminous flux of a further fluorescent lamp and the lighting time thereof.

A fluorescent lamp was made in the same way but using $Y_2O_3$:Eu as the phosphor. The relationship between luminous flux and lighting time for this lamp after 300-hour life test is shown in FIG. 17. After rising to a point A, the luminous flux drops to a point B and then rises to stable point C. It was found that the dropping of the luminous flux decrement from the point A to the point B depends upon the charging tendency of the phosphor. FIG. 18 is a graph showing the charge tendency of the phosphor $Y_2O_3$:Eu against the reduced iron powder and the luminous flux decrement. The decrement is expressed as $\{(A-B)/A\}\times 100\%$, where A and B means the relative luminous flux at A and B points in FIG. 17, respectively.

EXAMPLE 24

Phosphor particles were prepared to have a certain charging tendency by coating particle surfaces of green-emitting phosphor (La, Ce. Tb)(P, Si)O4 with 0.1 weight % of MgO. A fluorescent lamp having an inner wall load of 750 W/m² and such structure as shown in FIG. 10 was made and the phosphor Lighting test was conducted for this fluorescent lamp. Its luminous flux rising and other characteristics were improved to a greater extent, as compared with those of the conventional fluorescent lamps.

The same results were obtained in the case where a mixture of two or more of red-emitting phosphor $Y_2O_3$:Eu, green-emitting phosphor (La, Ce, Tb)(P, Si)O4 and blue-emitting phosphor $BaMg_2Al_{11}O_{27}$:Eu was used. FIG. 19 is a graph showing the relationship between luminous flux decrement and charging tendency in the case where the fluorescent lamp was made using the phosphor of three component mixture type.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A fluorescent lamp comprising:
   a light transmission glass tube;
   a phosphor layer formed on the inner wall of the light transmission glass tube and including phosphor particles;
   gases filled in the light transmission glass tube and including a mercury gas and rare gases; and
   a means, arranged in the light transmission glass tube, for generating positive column discharge in the gas;
   wherein said phosphor particles are coated with a coating material comprising at least one oxide of a substance selected from the group consisting of Mg, Ca, Sr, Ba, La, Eu, Y, Tm, Dy, Nd, Cd, Co, Zn, Pb, Ni, Sc, Hg, Cu, Mo, In, Hf, Ga, Ce, Cr, Fe, Zr, As, B, Mn, Tl, Bi, Ge, Sn, Ta, P, V and Nb, and the charging tendency of the phosphor particle coated with said oxide is negative relative to an oxide of a substance having a cation electronegativity $X_i$ 7.0 but positive relative to an oxide of a substance having a cation electronegativity $X_i$ of 11.8, wherein $X_i=(1+2z) X_0$ in which z represents an ion valency of a cation and $X_0$ represents Pauling's electronegativity.

2. The fluorescent lamp according to claim 1, wherein inner wall load of the lamp is in a range of 500–2000 W/m².

3. The fluorescent lamp according to claim 1, wherein the oxide includes oxide of at least one metal selected from the group consisting of Mg, Ca, Sr, Ba, Zn, Al/Ga, Y, rare earths, B, P, Ta, Ti, and Si.

4. The fluorescent lamp according to claim 3, wherein the amount of the metal oxide coated on the phosphor particles is in a range of 0.01–3.0 weight %.

5. The fluorescent lamp according to claim 1, wherein the phosphor particles include those of at least one green-emitting phosphor selected from the group consisting of rare earth aluminate-silicate-phosphate phosphor activated by cerium and terbium, rare earth borate-silicate-phosphate phosphor, rare earth borate-silicate-phosphate phosphor and rare earth aluminate-borate-phosphate phosphor.

6. The fluorescent lamp according to claim 1, wherein a three-component type rare earth phosphor composition is used as the phosphor.

7. The fluorescent lamp according to claim 1, wherein said coating material contains an additive comprising at lease one oxide of a substance selected from the group consisting of Al, Ti, and Si.

8. A fluorescent lamp comprising:
   a light transmission glass tube;
   a phosphor layer formed on the inner wall of the light transmission glass tube and including phosphor particles;
   gases filled in the light transmission glass tube and including a mercury gas and a rare gases; and
   a means, arranged in the light transmission glass tube, for generating positive column discharge in the gas;
   wherein said phosphor particles are charged positive and smaller than 3.0 $\mu$C per gram as measured when in contact with soda lime glass beads each having a particle size of 200–500 μm, and the phosphor particles are coated with at least one oxide of a substance selected from the group consisting of Mg, Ca, Sr, Ba, La, Eu, Y, Tm, Dy, Nd, Cd, Zn, Co, Pb, Ni, Sc, Hg, Cu, Mo, In, Hf, Ga, Ce, Cr, Fe, Zr, As, B, Mn, Tl, Bi, Ge, Sn, Ta, P, V and Nb.

9. The fluorescent lamp according to claim 8, wherein inner wall load of the lamp is in a range of 500–200 W/m$^2$.

10. The fluorescent lamp according to claim 8, wherein the oxide includes oxide of at least one metal selected from the group consisting of Mg, Ca, Sr, Ba, Zn, Al Ga, Y rare earths, B, P, Ta, Ti and Si., 11. The fluorescent lamp according to claim 10, wherein the amount of the metal oxide coated on the phosphor particles is in a range of 0.01–3.0 weight %.

12. The fluorescent lamp according to claim 8, wherein the phosphor particles include those of at least one green-emitting phosphor selected from the group consisting of rare earth aluminate-silicate-phosphate green emission phosphor activated by cerium and terbium, rare earth borate-silicate-phosphate phosphor, rare earth orthophosphate phosphor and rare earth aluminate-borate-phosphate phosphor.

13. The fluorescent lamp according to claim 8, wherein a three-component type rare earth phosphor composition is used as the phosphor.

14. The fluorescent lamp according to claim 8, wherein said coating material contains an additive comprising at least one oxide of a substance selected from the group consisting of Al, Ti, and Si.

15. A fluorescent lamp comprising:
a light transmission glass tube;
a phosphor layer formed on the inner wall of the light transmission glass tube and including phosphor particles;
gases filled in the light transmission glass tube and including a mercury gas and a rare gases; and
a means, arranged in the light transmission glass tube, for generating positive column discharge in the gas;
wherein said phosphor particles are charged positive and larger than −0.5 μC per gram and less than 2.5 μC per gram when they are brought into contact with reduced iron powder having a particle size of 44–74 μm, and the phosphor particles are coated with at least one oxide of a substance selected from the group consisting of Mg, Ca, Sr, Ba, La, Eu, Y, Tm, Dy, Nd, Cd, Zn, Co, Pb, Ni, Sc, Hg, Cu, Mo, In, Hf, Ga, Ce, Cr, Fe, Zr, As, B, Mn, Tl, Bi, Ge, Sn, Ta, P, V and Nb.

16. The fluorescent lamp according to claim 15, wherein inner wall load of the lamp is in a range of 500–200 W/m$^2$.

17. The fluorescent lamp according to claim 15, wherein the metal oxide includes oxide of at least one metal selected from the group consisting of Mg, Ca, Sr, Ba, Zn, Al Ga, Y rare earths, B, P, Ta, Ti and Si.

18. The fluorescent lamp according to claim 17, wherein the amount of the metal oxide coated on the phosphor particles is in a range of 0.01–3.0 weight %.

19. The fluorescent lamp according to claim 15, wherein the phosphor particles include those of at least one green-emitting phosphor selected from the group consisting of rare earth aluminate-silicate-phosphate phosphate green emission phosphor activated by cerium and terbium, rare earth borate-silicate-phosphate phosphor, rare earth orthophosphate phosphor and rare earth aluminate-borate-phosphate phosphor.

20. The fluorescent lamp according to claim 15, wherein a three-component type rare earth phosphor composition is used as the phosphor.

21. The fluorescent lamp according to claim 15, wherein said coating material contains an additive comprising at lease one oxide of a substance selected from the group consisting of Al, Ti, and Si.

* * * * *

UNITED STATES PATENT AND TRADEMARK OFFICE
CERTIFICATE OF CORRECTION

PATENT NO. : 5,289,081
DATED : February 22, 1994
INVENTOR(S) : TAMATANI, Masaaki; ITO, Hidenori; TAYA, Akira; YUGE, Yoji; NAKAGAWA, Kazuaki; ANDO, Shigeru; TERESHIMA, Kenji It is certified that error appears in the above-indentified patent and that said Letters Patent is hereby corrected as shown below:

Column 25, line 9, change "200" to --2000--; and

Column 26, line 16, change "200" to --2000--.

Signed and Sealed this

Sixth Day of September, 1994

Attest:

BRUCE LEHMAN

Attesting Officer        Commissioner of Patents and Trademarks